United States Patent
Emmanuel et al.

(10) Patent No.: US 11,843,817 B2
(45) Date of Patent: Dec. 12, 2023

(54) INTELLIGENT MAPPING FOR FAST ACCESS OF ANY CONTENT TYPE

(71) Applicant: Rovi Guides, Inc., San Jose, CA (US)

(72) Inventors: Daina Emmanuel, Bangalore (IN); Ashish Gupta, Karnataka (IN); Vaibhav Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/224,697

(22) Filed: Apr. 7, 2021

(65) Prior Publication Data

US 2022/0329898 A1  Oct. 13, 2022

(51) Int. Cl.
| | |
|---|---|
| *H04N 21/422* | (2011.01) |
| *H04N 21/442* | (2011.01) |
| *H04N 21/466* | (2011.01) |
| *G06V 40/20* | (2022.01) |
| *G06F 18/22* | (2023.01) |
| *G06F 18/214* | (2023.01) |

(52) U.S. Cl.
CPC . *H04N 21/42218* (2013.01); *H04N 21/44204* (2013.01); *H04N 21/4667* (2013.01); *G06F 18/214* (2023.01); *G06F 18/22* (2023.01); *G06V 40/20* (2022.01)

(58) Field of Classification Search
None
See application file for complete search history.

(56) References Cited

U.S. PATENT DOCUMENTS

| | | | |
|---|---|---|---|
| 2010/0030615 A1* | 2/2010 | Doyle | G06Q 30/0203 709/204 |
| 2010/0030645 A1* | 2/2010 | Watanuki | H04N 7/17318 709/219 |
| 2011/0119713 A1* | 5/2011 | Chang | H04N 21/43637 715/740 |
| 2019/0349634 A1* | 11/2019 | Rasool | H04N 21/44204 |

* cited by examiner

*Primary Examiner* — Jefferey F Harold
*Assistant Examiner* — Charles N Hicks
(74) *Attorney, Agent, or Firm* — HALEY GUILIANO LLP

(57) ABSTRACT

Systems and methods for mapping keys on a remote control device to digital content items are disclosed. An algorithm is trained, based on user's consumption pattern, to determine whether a digital content item would be relevant to the user. If the digital content item matches the consumption pattern, then a key is automatically mapped, and if it does not, then a notification that includes a mapping suggestion is generated and mapped upon approval. A mapping table is updated to store only valid mappings. An input of a key results in quick display of the mapped digital content item from where it was previously exited.
A key can be mapped to a single or multiple digital content items. If similarities are detected between multiple digital content items, then they may both be mapped to the same key.

20 Claims, 16 Drawing Sheets

900

| Remote Key | Media Content / Application |
|---|---|
| Key 1 | Channel: Food52 |
| Key 2 | App: Amazon Prime |
| Key 3 | Movie: Transformers<br>Series: Friends |
| Key 4 | PWA / Web URL |
| ... | Media Content / Application *n* |
| Key *n* | You Tube Channel:<br>Music Videos by Maroon 5 |

FIG. 9

| Key | Application | Digital Content Item | Resume Time |
|---|---|---|---|
| Key 1 | Disney+ | Frozen 1 Movie | 14 Mins 3 Seconds |
| | Disney+ | Avengers 2 Movie | 58 Mins 11 Seconds |
| | Netflix | Mission Control Movie | 8 Mins 7 Seconds |
| Key 2 | PBS | Documentary on NASA Flight | 12 Mins 9 Seconds |
| | HBO Go | The Astronaut Farmer Movie | 0 Mins 0 Seconds |

| Key # | Application | Media Asset | Season / Episode | Resume Position |
|---|---|---|---|---|
| Jack | PBS Kids | Tom and Jerry Cartoon | 12 / 48 | 5 Mins 12 Seconds |
| BB | Netflix | Big Bang Theory TV Show | 5 / 17 | 9 Mins 31 Seconds |

| Key # | Application | Digital Asset | Page Marker | Resume Position |
|---|---|---|---|---|
| SCI | Google Chrome | NASA Website | Page 7 | Page 7 |

| Key # | Application | Digital Asset | Marker | Resume Position |
|---|---|---|---|---|
| UD | Microsoft Edge | Udemy Course on Streaming Video | Chapter 4 | 7 Mins 18 Seconds |

FIG. 13

INTELLIGENT MAPPING FOR FAST ACCESS OF ANY CONTENT TYPE

FIELD OF INVENTION

Embodiments of the present disclosure relate to mapping of keys on the remote control devices, and more particularly to methods and systems for automatically suggesting and mapping remote control keys to digital content items for enabling fast access to digital content item such that it can be quickly displayed on a media device.

BACKGROUND

In current times the content world is crowded with a massive amount of content. Media devices, such as Smart TVs, provide pages of browsing menus that include content available for viewing through several content providers and streaming services, such as Netflix, HBO Go, and Comcast (Netflix is a trademark owned by Netflix Inc., and HBO Go is a trademark owned by Home Box Office, Inc., Comcast is a trademark of Comcast Corporation). Searching through the content is a struggle and applications have been introduced to make search easier.

Once a content item is selected to watch, due to their busy schedules, users often do not watch the entire content item in one sitting. Instead, they watch parts of a movie piecemeal or watch an episode(s) of a multi-episode series over a period of time. Although it is convenient for the user to watch the content in segments that fit their schedule, there is no easy method that allows the user to return to the content and resume playing from where they exited it last.

Some attempts have been made to ease the return to an application. For example, physical remote controls have been custom-designed to include a Netflix button that can be pressed by the user to launch the Netflix application. Other attempts allow a user to manually map a hotkey from their remote control to a specific channel. However, these solutions are limited and are not designed to accommodate today's user behavior of watching content. For example, a user may jump from one application to another and from content within one application to content of another application. Current methods do not provide a solution that can, with a single selection of a button, allow the content from any application to be launched from where it was exited last.

Yet another problem with current methods is that they require the user to make all the decisions and remember which key of their remote was designated for which channel. For example, a user desiring to designate a key of their remote control to a channel would have to decide which key to use and which content to map and manually select the key on their remote control and the content that should be designated to the key. Furthermore, if the user has designated more than one key to different content, then the user is required to remember which key is associated with content which can be challenging for the user.

Current methods also have physical limitations based on the number of keys on the remote-control device that can be designated. Once the user runs out of keys on the remote, they can no longer designate any keys on the remote until they manually delete a previously designated key and its content.

Manually dedicating remote control keys, making the decision which key to designate and what content to map, being limited by the physical number of keys on the remote control and having to remember which key mapped to which content are a few of the problems faced with current methods that make it challenging and cumbersome for a user to have fast access to a content they would like to resume playing. Several other problems, such as not knowing whether the content mapped is still available, being limited to mapping only certain applications, and being tied to one physical remote control for mapping, further add to the challenge.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 9 is a mapping table, in accordance with some embodiments of the disclosure;

FIG. 10 is a mapping table where a single key is assigned to multiple digital content items, in accordance with some embodiments of the disclosure;

FIG. 11 is a mapping table with personalized key names, in accordance with some embodiments of the disclosure;

FIG. 12 is a mapping table depicting mapping of a Website URL, in accordance with some embodiments of the disclosure;

FIG. 13 is a mapping table depicting mapping to a paid course, in accordance with some embodiments of the disclosure;

DETAILED DESCRIPTION

Figure 1A:
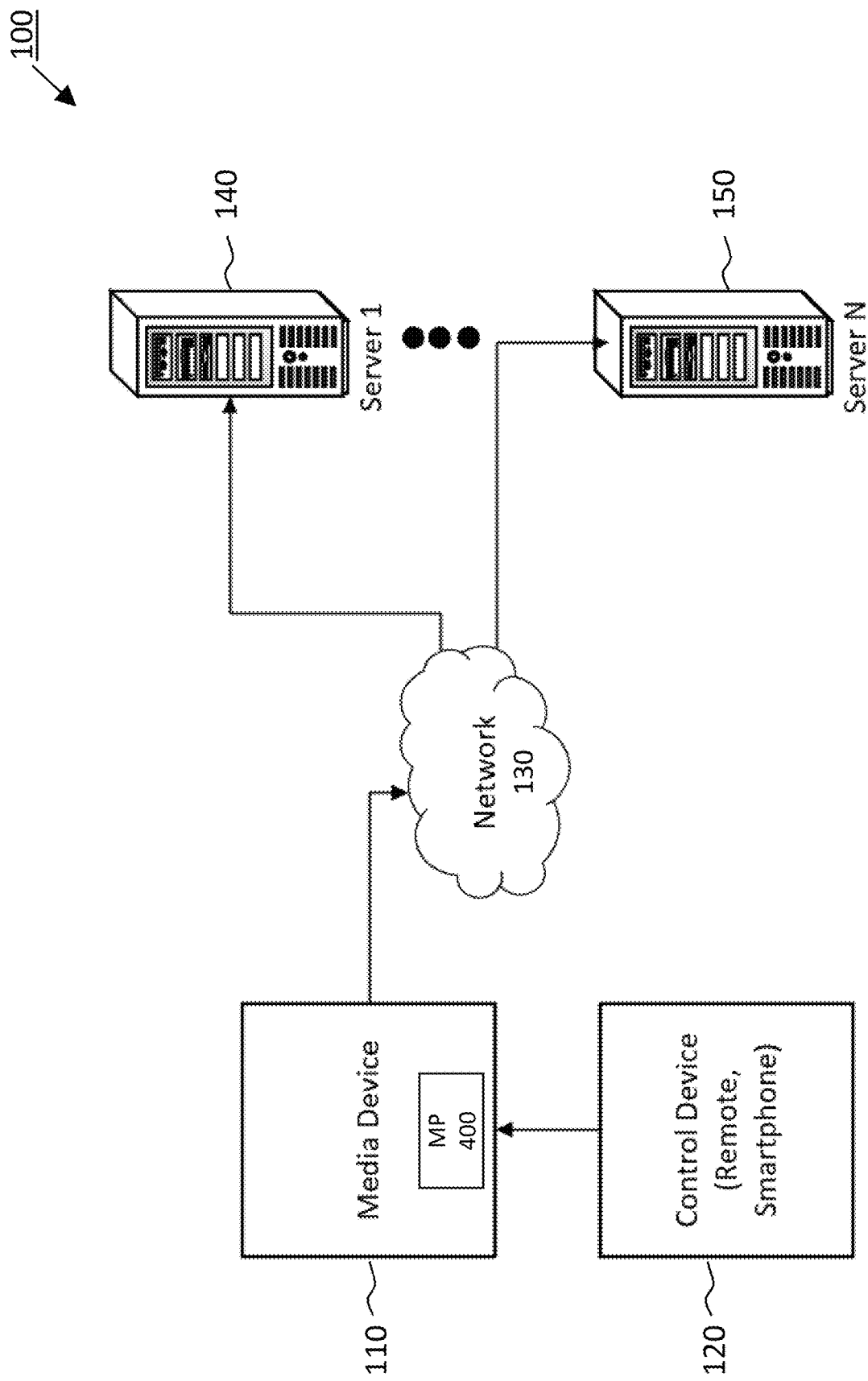
FIG. 1A is a block diagram of an exemplary system for mapping keys, in accordance with some embodiments of the disclosure.

In accordance with some embodiments disclosed herein, the above-mentioned limitations are overcome by automatically mapping a key of a remote control device to a digital content item if the digital content item, based on content consumption history or pattern of a user (i.e., the user's behavior pattern), is determined to be relevant to the user. However, if, based on user content consumption history or pattern, the system is unable to determine whether the digital content item would be relevant to the user the system generates a notification suggesting the mapping, which can be approved to then map the key to the digital content item.

In some embodiments, a display or output from a tuner, of a digital content item is detected. If the display has been playing for a duration that meets a threshold duration, then the system automatically makes a decision to map the digital content item to a key of the remote control device. The threshold is predetermined and is an indicator of the user's interest in the content. For example, if a user browsing through various digital content items on the display screen displays a digital content items for just a few minutes, the user may not be interested in that digital content item. If the user is not interested, the digital content item that is not relevant or not of interest does not need to be mapped; thus if the threshold duration is not met, the mapping process is not activated.

In operation, the mapping is carried out either automatically or through a notification process. Selecting between automated mapping and notification-based mapping depends on whether the digital content item matches a category of past user behavior.

In some embodiments, once a decision is made to map the digital content item, a user consumption history analysis, also referred to herein as behavior pattern recognition analysis, is performed. The analysis involves determining if the digital content item outputted by a tuner would be relevant and of interest to the user, and if so, the system automatically maps the digital content item to a key on the remote control device. In order to determine whether the digital content item is relevant to the user, an algorithm that has been trained based on past user behavior that relates to prior consumption of content, including being trained in a plurality of user behavior categories, is used to predict whether the digital content item would be relevant and of interest to the user. Some of the categories, for example, include a) has the user previously watched the digital content item, b) has the user purchased the digital content item within a threshold time, c) is the digital content item in the same genre as previously watched or liked by the user, d) is the digital content item part of a series having multiple episodes of which the user has watched at least one or some episodes, e) has the user liked similar content in the past, and e) has a contact of the user recommended the digital content item to the user. Additional categories can also be used to determine the likelihood of user interest.

As user behavior data is gathered over time and fed into the algorithm to further train it on user behavior, the algorithm's prediction capability is enhanced, thereby resulting in determining with a higher probability whether the digital content item will be of interest to the user.

If the digital content item matches a user behavior category, which is an indicator that the digital content item will likely be of interest to the user, a determination is made that a key is to be automatically mapped to the digital content item.

Prior to mapping the key, an analysis is performed to determine which key, of the plurality of keys on the remote control device, should be mapped. A mapping table is queried to obtain a list of all the keys that are mapped to various digital content items. A comparison is performed between the current digital content item to be mapped and already mapped digital content item to determine if there are any similarities. These similarities include same genre, same actors, same application, part of the same series, or other common factors. If a similarity is detected, then the current digital content item may be mapped to the same key that is already mapped to another digital content item that is similar to the current digital content item. Mapping more than one digital content item to the same key by grouping them based on some similarity makes it convenient and user-friendly for the user to access all similar content by the press of a mapped single key.

All the mapped keys are stored in a mapping table. Along with the keys, the metadata and source address of the digital content item associated with the mapped key are saved in the mapping table. Among other details of the digital content item, the metadata also includes an exit time stamp, which correlates with the time in the digital content item when the user exited the digital content item, e.g., 34 mins and 14 seconds into the movie.

The mapping table is updated periodically such that the mappings are kept current. If the digital content item associated with the key becomes unavailable for any reason, is deleted, or is scheduled to be released far out in time, then the mapping is determined to be invalid and removed from the mapping table. Keeping the mapping table updated ensures that every time the user inputs the mapped key, the digital content item to which it is mapped is still available for viewing and can be accessed and displayed.

Once the keys are mapped, the keys and the mapping are accessible on any connected device, e.g., if Key #6 is mapped, it can be accessed through a physical remote control, a mobile phone that can act as a remote control, or any other electronic device as long it can connect to the media device. The system upon command can display a mapping table that displays all the keys and their mappings such that the user does not need to remember which key is mapped to which content.

An input of a mapped key allows the system to access the stored source address and use it to automatically launch the digital content item, including the application on which the digital content item is provided. The metadata stored is used to resume playing of the digital content item from a point in time where the user had previously exited. As such, with one touch of a mapped key, the display resumes playing from the place where the use had previously exited without having to navigate through multiple display screens, opening different applications, opening the associated media asset within the application, and then resuming display of the digital content item.

Figure 1B:
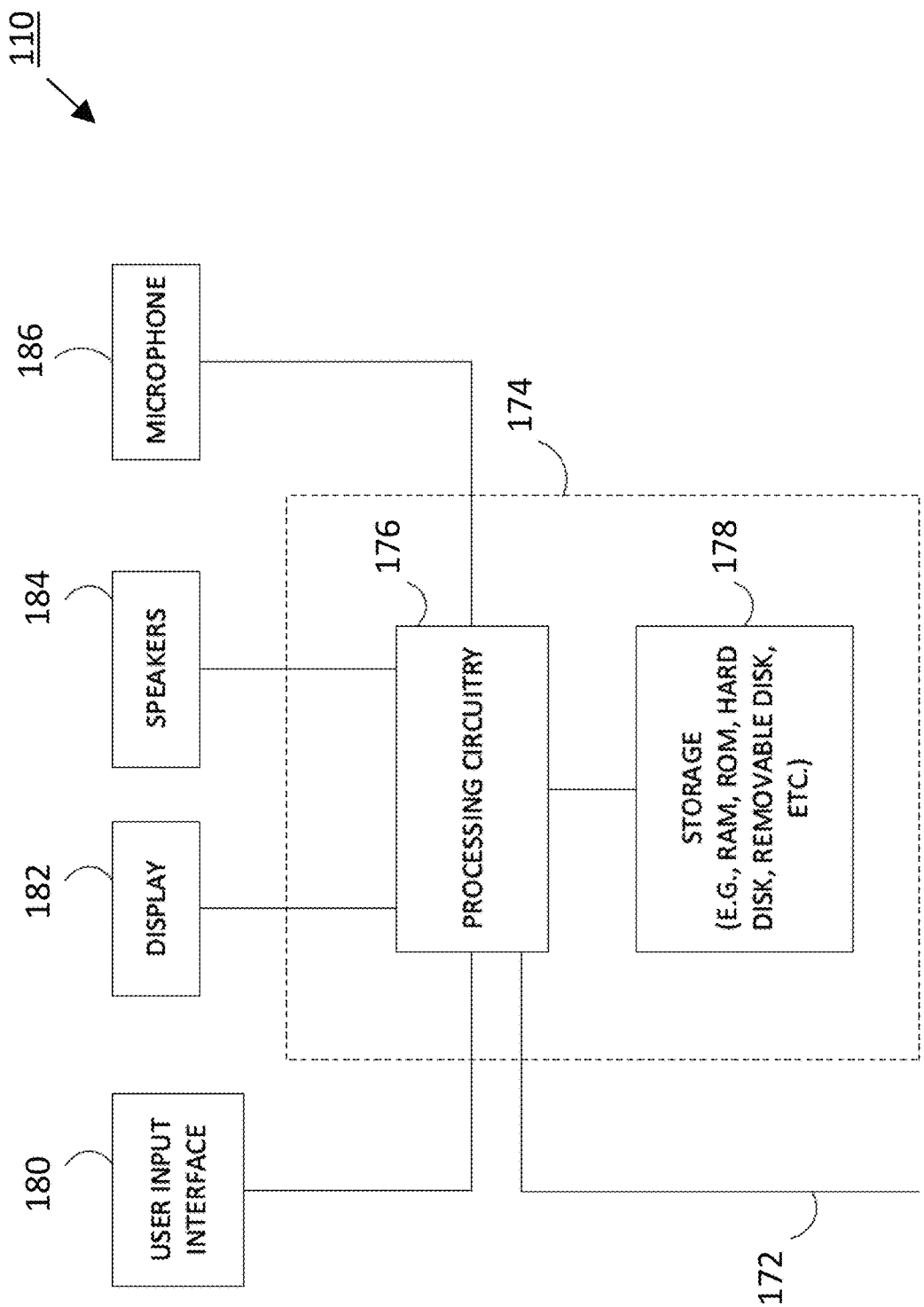
FIG. 1B is a block diagram of a generalized media device, in accordance with some embodiments of the disclosure.

FIGS. 1A and 1B are block diagrams of exemplary devices, systems, servers, and related hardware for mapping remote control keys to digital content items, in accordance with some embodiments of the disclosure. In the system 100, there can be more than one media device 110 and more than one control device 120, but only one is shown in FIG. 1A to avoid overcomplicating the drawing. In addition, more than one type of media device 110 and one type of control device 120 may be utilized in accordance with the embodiments. In one embodiment, there may be paths between media device, control device 120, Server 1 (140) and Server 2 (150), so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In one embodiment, when there are multiple media devices, they may communicate with each other via the communications network 130.

The media device may be coupled to communications network 130. The control device 120 may be coupled to media device directly or through communications network 130. The control device 120 may also be connected to the media device 110 through wireless paths (e.g., Bluetooth, infrared, IEEE 802-11x, local hub or router, Wifi etc.), or other short-range communication via wired or wireless paths. The communications network 130 may be one or more networks including the Internet, a mobile phone network, mobile voice or data network (e.g., a 4G or LTE network), cable network, public switched telephone network, or other types of communications network or combinations of communications networks. The path between the device may separately or in together with other paths include one or more communications paths, such as, a satellite path, a cable path, a path that supports Internet communications (e.g., IPTV), free-space connections (e.g., for broadcast or other wireless signals), or any other suitable wired or wireless communications path or combination of such paths. In one embodiment path can be a wireless path.

The system 100 also includes server 1 (140) and server 2 (150), which can be coupled to any number of databases providing information to the media device. Server 1 and 2 represent any computer-accessible source of content, such as a storage for digital content item, metadata, or similar such information. Server 1 and 2 may store and execute various software modules for processing requests from media device and transmitting digital content item as requested, such as movies, sitcoms, series with episodes, and websites. In some embodiments, the media device 110 and Servers 1 and 2 may store metadata associated with a digital content item.

FIG. 1B is a block diagram of a generalized media device 110, in accordance with some embodiments of the disclosure. The media device 110 may receive content and data via input/output (hereinafter "I/O") path 172. The I/O path 172 may provide digital content item (e.g., streaming video, media assets, broadcast programming, on-demand programming, Internet content, television series with episodes, or content available over a local area network (LAN) or wide area network (WAN), personal cloud content and/or other content) and data to control circuitry 174, which includes processing circuitry 176 and a storage 178. The control circuitry 174 may be used to send and receive commands, requests, and other suitable data using the I/O path 172. The I/O path 172 may connect the control circuitry 174 (and specifically the processing circuitry 176) to one or more communications paths. I/O functions may be provided by one or more of communications paths used in FIGS. 1A and 1B.

The control circuitry 174 may be based on any suitable processing circuitry such as the processing circuitry 176. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor). The mapping of keys to the digital content item can be at least partially be implemented using the control circuitry 174. The mapping of keys to the digital content item described herein in the embodiments may be implemented in or supported by any suitable software, hardware, or combination thereof. The mapping of keys to digital content item can be implemented on media device, on servers, on remote control devices, or across all.

In client/server-based embodiments, the control circuitry 174 may include communications circuitry suitable for communicating with one or more servers that may at least implement the mapping of keys to digital content item functionality. The instructions for carrying out the above-mentioned functionality may be stored on the one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables communication between media device and other devices of the system or remote devices.

Memory may be an electronic storage device provided as the storage 178 that is part of the control circuitry 174. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 178 may be used to store various types of digital content items, mapping of keys, and source and metadata associated with a digital content item as described in some of the embodiments. Nonvolatile memory may also be used (e.g., to launch a boot-up routine and other instructions). Cloud-based storage may also be used to supplement the storage 178 or instead of the storage 178.

The control circuitry 174 may include audio generating circuitry and tuning circuitry, such as one or more analog tuners, audio generation circuitry, filters or any other suitable tuning or audio circuits or combinations of such circuits. The control circuitry 174 may also include scaler circuitry for upconverting and down converting content into the preferred output format of the media device 110. The control circuitry 174 may also include digital-to-analog converter circuitry and analog-to-digital converter circuitry for converting between digital and analog signals. The tuning and encoding circuitry may be used by the media device 110 to receive digital content item and display it on a screen of the media device. The circuitry described herein, including, for example, the tuning, audio generating, encoding, decoding, encrypting, decrypting, scaler, and analog/ digital circuitry, may be implemented using software running on one or more general purpose or specialized processors. If the storage 178 is provided as a separate device from the media device 110, the tuning and encoding circuitry (including multiple tuners) may be associated with the storage 178.

The user may utter voice instructions to the control circuitry 174, which are received by the microphone 186. The microphone 186 may be any microphone (or microphones) capable of detecting human speech. The microphone 186 is connected to the processing circuitry 176 to transmit detected voice commands and other speech thereto for processing.

The media device 110 may optionally include an interface 180. The interface 180 may be any suitable user interface, such as a remote control, mouse, trackball, keypad, keyboard, touchscreen, touchpad, stylus input, joystick, or other user input interfaces. A display 182 may be provided as a stand-alone device or integrated with other elements of the media device 110. For example, the display 182 may be a touchscreen or touch-sensitive display. In such circumstances, the interface 180 may be integrated with or combined with the microphone 186. When the interface 180 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 180 may be HDTV-capable. In some embodiments, the display 182 may be a 3D display. The speaker (or speakers) 184 may be provided as integrated with other elements of media device 110 or may be a stand-alone unit.

Figure 2A:
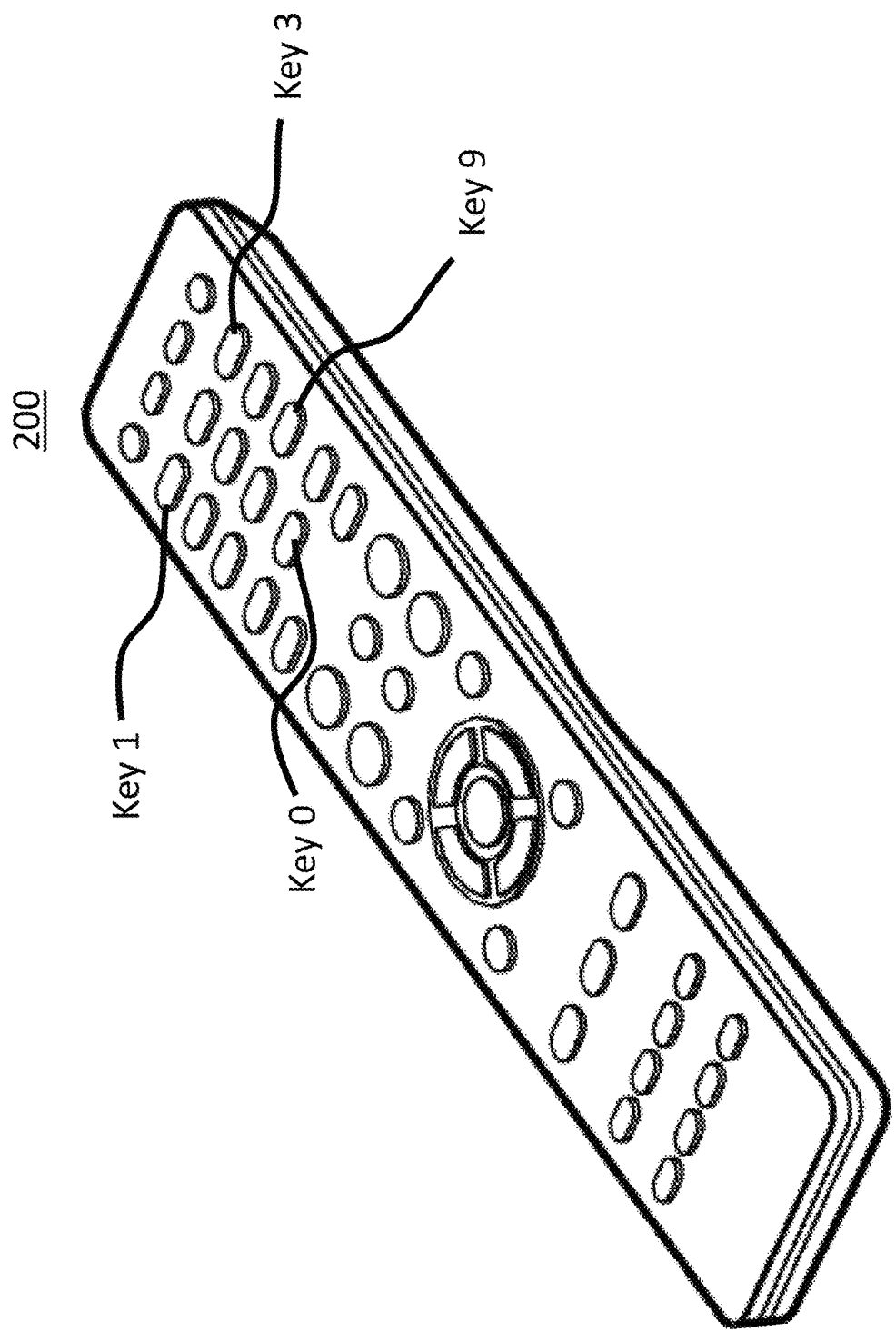
FIG. 2A is a standard television remote control device that can be used for mapping keys, in accordance with some embodiments of the disclosure.
Figure 2C:
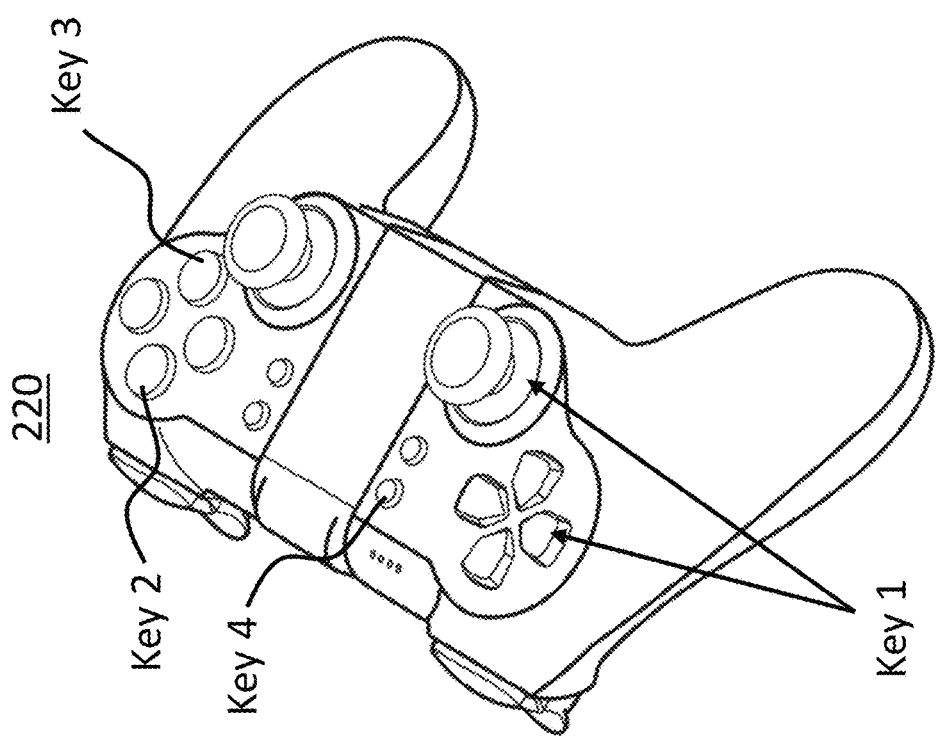
FIG. 2C is a gaming device used as a remote control for mapping keys, in accordance with some embodiments of the disclosure.
Figure 2B:
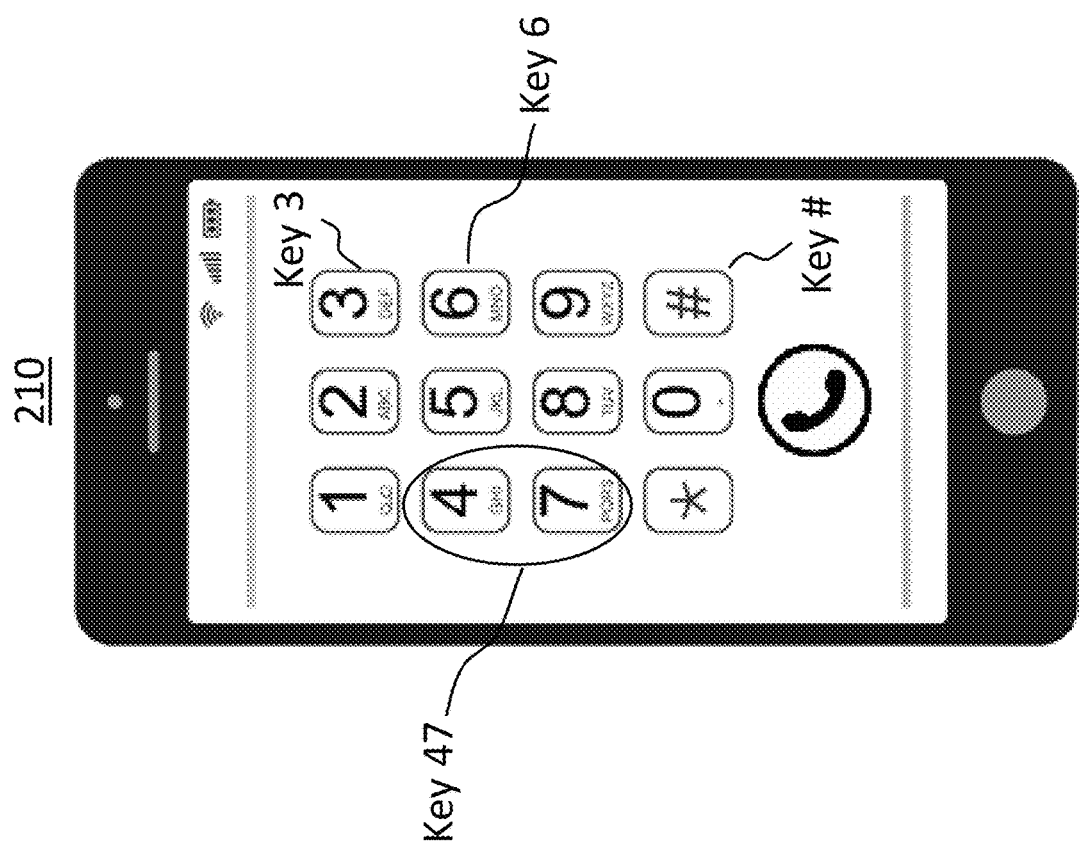
FIG. 2B is a mobile phone used as a remote control for mapping keys, in accordance with some embodiments of the disclosure.

FIGS. 2A-2C are exemplary remote control devices that can be used in accordance with some embodiments of the disclosure. FIG. 2A is a standard television remote control device 200 that can be used for mapping keys, in accordance with some embodiments of the disclosure.

In one embodiment, four of the remote control keys are mapped to separate digital content items. For example, Key 1 may be mapped to an application such as Netflix, Key 3 may be mapped to a website URL, Key 9 may be mapped to a show on Hulu (Hulu is a trademark owned by Hulu, LLC), and Key 0 may be mapped to a documentary on PBS. Digital content item, as referred to herein, can be a media asset (such as a movie, episode of a series, documentary, pages of a website URL, content on a personal cloud, or a TikTok video [TikTok is a trademark owned by ByteDance Ltd]), an application (such as Netflix, HBO Go, Amazon Prime [Amazon Prime is a trademark owned by Amazon Technologies, Inc], YouTube [YouTube is a trademark owned by Google Inc.], on-demand programming, streaming media service provider applications, cable provider applications), a website URL, a personal cloud, a television channel, and an educational course or channel.

Once mapped, the mapping of the key and the digital content item to which it is mapped are stored in a mapping table. Upon the media device receiving an input of the mapped key by the user pressing the key on the remote control device, the display of the digital content item that is mapped is displayed on the media device.

FIG. 2B is a mobile phone 210 used as a remote control for mapping keys, in accordance with some embodiments of the disclosure. Using the mobile phone, a single digit, multiple digits, a single alphabet, multiple alphabets, or a word or combination of numbers can be used as a key that can be mapped to a digital content item. As depicted, Key 3, Key 6, Key 47, and Key # are mapped to different digital content items.

Once mapped, the mapping of the key and the digital content item to which it is mapped are stored in a mapping table. Upon the media device receiving an input of the mapped key from the mobile phone, the digital content item that is mapped is displayed on the media device.

FIG. 2C is a gaming device 220 used as a remote control for mapping keys, in accordance with some embodiments of the disclosure. A key of the gaming device can be used to map a digital content item. As depicted, Keys 1-4 of the gaming device are mapped to different digital content items.

Although a few exemplary remote control devices are depicted, the embodiments are not so limited, and other types of physical and electronic devices that can be used as remote controls are also contemplated. For example, a tablet, a smart watch, a digital pointer, or any other smart electronic device capable of communicating with the media device can be used as a remote control device.

Once a key is mapped on any remote control device, it can be accessed from any other electronic device that can communicatively connect to the media device. For example, if keys on a physical remote control are mapped to separate digital content items, such as Key 1, Key 3, Key 9, and Key 0 in FIG. 2A, then the same keys can be accessed by the mobile phone. As such, the same mapped content can be accessed whether mapped keys are inputted through the physical remote in FIG. 2A or the mobile phone used as a remote in FIG. 2B.

Figure 3:
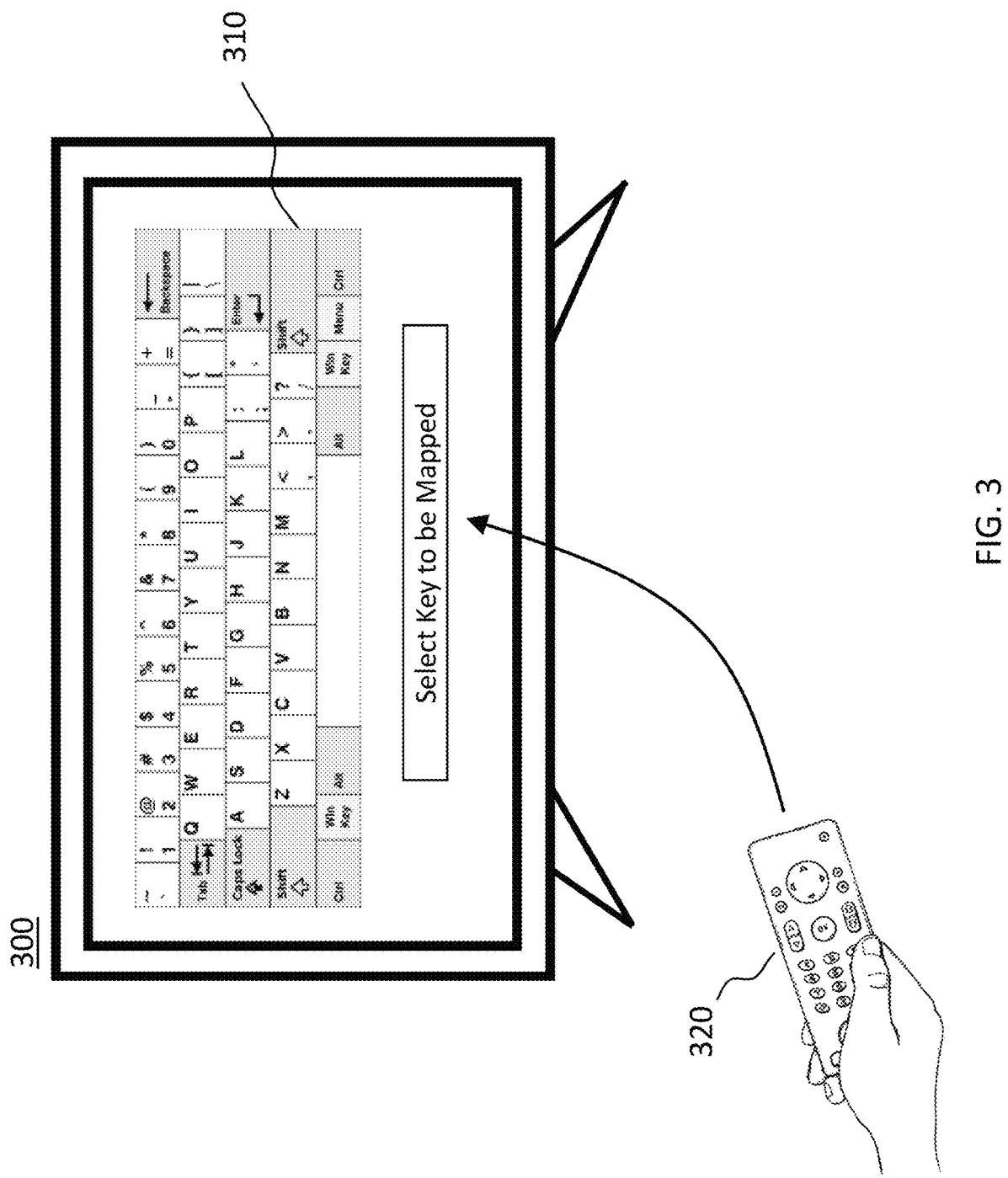
FIG. 3 is block diagram of a Smart Television displaying a digital keyboard and a remote control device, in accordance with some embodiments of the disclosure.

FIG. 3 is block diagram of a Smart Television 300 displaying a digital QWERTY keyboard 310 and a remote control device 320, in accordance with some embodiments of the disclosure. In some embodiments, such as in a standard physical remote control as shown in FIG. 2A, the physical keys on a remote control device may be limited in number. As such, a user may select a key on their remote control device causing the QWERTY keyboard 310 to appear on the display screen of the media device 300.

The QWERTY keyboard 310 allows a wide selection of keys that are numbers and alphabets, both in English and other languages. Using these numbers and alphabets, numerous keyword combinations can be created. Additionally, symbols and icons from various libraries, or user-created or imported unique symbols and words can also be used as a key for mapping digital content item.

Figure 4:
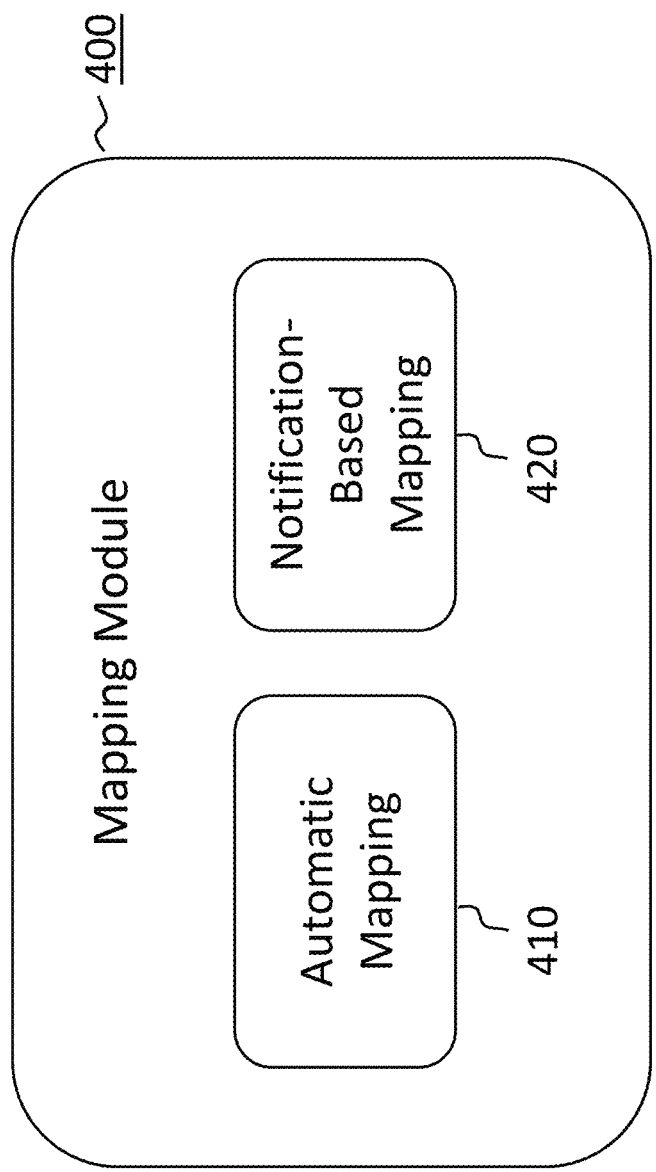
FIG. 4 is a block diagram of mapping modules used by the media device, in accordance with some embodiments of the disclosure.

FIG. 4 is a block diagram of mapping modules used by the media device, in accordance with some embodiments of the disclosure. In one embodiment, system 100 includes a mapping module 400. The mapping module may be located in the media device 110 or located remote to the media device and connected to the media device though network 130.

The mapping module 400 determines whether to map a digital content item to a key on the remote control device and, based on an affirmative determination, maps the key. Once mapped, an input of the key results in launching of the digital content item from a specific location, such as a point in the timeline of the digital content item, a specific page, a specific chapter of a book, etc. This point in the timeline may be where the user previously exited the digital content item.

The mapping module includes at least two sub-modules, the automatic mapping module 410 and the notification-based mapping module 420. Optionally, it may also include a manual mapping module (not shown) that allows a user to map a key by manually pressing on a key and assigning a digital content item.

The mapping module 400 determines whether to use the automatic mapping module 410 or the notification-based mapping module 420 to map a key on the remote control device to the digital content item. The determination to select between the automatic mapping module 410 or the notification-based mapping module 420 for mapping a key depends on whether the mapping module can automatically recognize that the digital content item matches a user behavior pattern, which is an indicator that the user will likely be interested in the digital content item, or if a pattern match cannot be detected, then user approval is required after a mapping is suggested to map the key. That is automatic mapping is used if pattern can be recognized, and notification-based mapping is used if user approval is required.

Pattern recognition is deployed by the mapping module by using an algorithm that is trained continuously or at periodic intervals with data points relating to the user's likes and dislikes of digital content items. In its machine learning mode, some examples of training the algorithm and updating it include training it each time a mapping is performed, a digital content item is displayed and the user either watches the content or moves on to another content, a user approves or disapproves a suggested mapping, a user likes or dislikes a digital content item, a social circle that the user follows recommends a digital content item to the user, or the user watches a digital content item in the same genre for a period of time that meets the threshold amount of time that is indicative of the user's interest in the content. Without limiting the disclosure, other examples of feeding the algorithm to enhance its performance may also be used.

Figure 8:
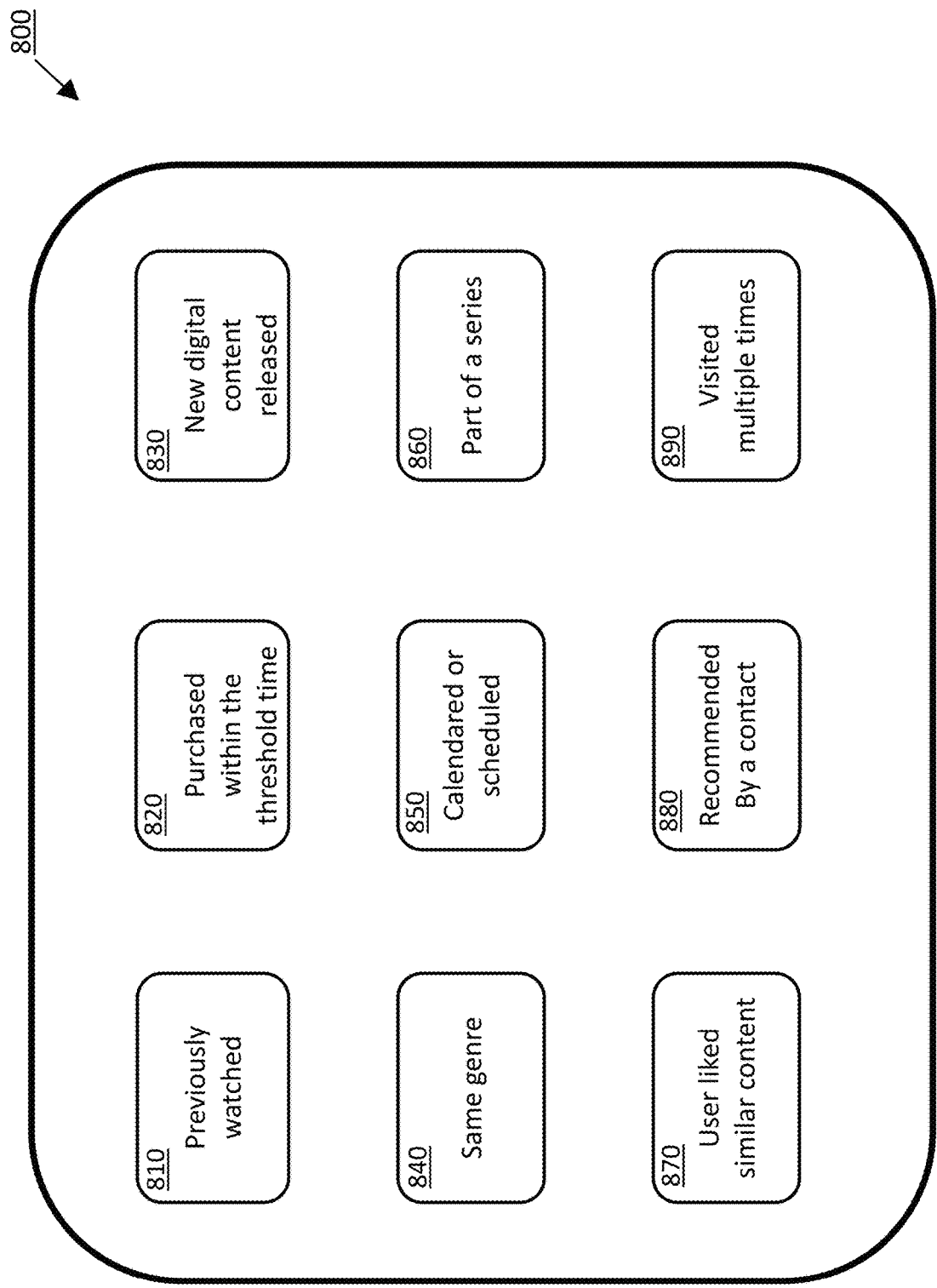
FIG. 8 is a block diagram of exemplary categories of user behavior patterns as they relate to prior consumption of content, in accordance with some embodiments of the disclosure.

The automatic recognition module 410 performs mapping automatically based on pattern recognition analysis performed by the algorithm. In some embodiments, when the automatic recognition module 410 detects the display of a digital content item, it analyzes the content by applying the algorithm to determine whether the digital content item can be associated with a pattern. FIG. 8 describes examples of various criteria considered in recognizing a prior digital content item consumption pattern. These include, for example, determining if the digital content item matches a user's profile, was previously watched by the user, or is part of a television or streaming video series having multiple episodes of which the user has already watched a few episodes, or is part of a genre that the user typically likes.

If a pattern is detected, then the automatic recognition module 410 maps a key on the remote control device to the digital content item. However, if a pattern is not detected, then the mapping module 400 uses the notification-based mapping module 420 instead of the automatic mapping module to map the key on the remote control device to the digital content item.

The notification-based mapping module 420 operates by providing a notification to the user and having the user decide whether or not to map the suggested digital content item. For example, if the user is watching a new digital content item that does not match a user behavior/consumption pattern, or if the user browsed a webpage that the user has not visited before, then, if the display duration of the digital content item meets the threshold (a minimal amount of time to gauge user interest in the content), the notification-based mapping module 420 provides a message to the user to approve or disapprove the suggested mapping.

In some embodiments, the notification is provided on the display screen of the media device 110, and in other embodiments the notification may be provided on the user's electronic device, such as a mobile phone, table, smart watch, remote control device if the remote control device includes a display, or any other device that the user has designated for receiving notifications.

The notification provided by the notification-based mapping module 420 may include the identification of a key on the remote control and a reference to the digital content item that the mapping module 400 has suggested to map. The notification may allow the user to approve or disapprove the mapping suggestion by making a Yes/No selection on their remote control device. Optionally, the user may also be provided with a modify selection where the user may choose to agree with the mapping but prefer that the mapping be made to a different key on their remote control device than the key suggested by the mapping module 400.

Figure 5:
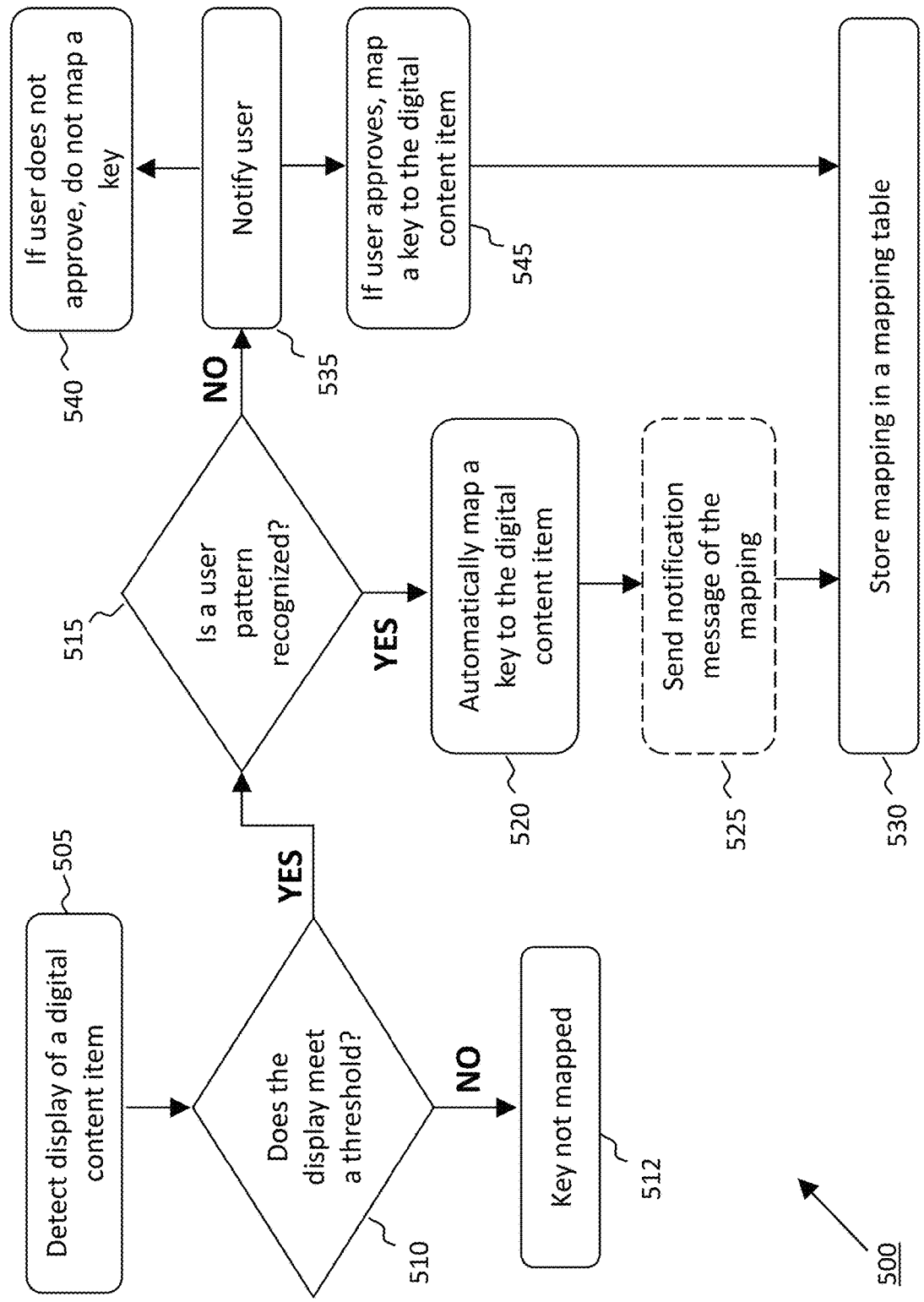
FIG. 5 is a flowchart of a process to map keys to digital content item, in accordance with some embodiments of the disclosure.

FIG. 5 is a flowchart of a process 500 to map keys to digital content items, in accordance with some embodiments of the disclosure. Process 500 maps a key of the remote control device to a digital content item and stores the mapping in a mapping table. The mapping of the key is either performed automatically or through user approval of a suggested mapping provided to the user through a notification by the system.

At block 505, display of a digital content item is detected. Specifically, system 100, through its control circuitry, detects that a digital content item is being displayed on the media device. The digital content item may be a media asset, such as a movie, TV series, web page, or any other digital content item described in the embodiments.

At block 510, a determination is made whether the display meets a threshold. The threshold is a predefined amount of time that the digital content item is played. The threshold can be the same or different for different types of digital content items. The threshold can be changed by the user or automatically by the system. In one embodiment, if the digital content item is a media asset, such as a movie or a television show, that is displayed, then the threshold may be a predefined amount of time or a percentage of the media asset watched. In another embodiment, if the digital content item is a Web URL, the threshold may be a predefined number of clicks on the same website, number of pages visited, or the amount of time spent on the website. In another embodiment, if the digital content item is an educational course, such as a school course, a course for learning a skill, or an online paid course, then the threshold may be the number of chapters visited, amount of time spent in the course, or number of questions answered in the chapters. As such, the threshold varies from digital content item to digital content item and can be changed periodically or on an as-needed basis.

If a determination is made at block 510 that the display duration does not meet the predefined threshold, then, at block 512, a key is not mapped to the display content. Not meeting the threshold is indicative of the user not being interested or engaged in the content. It can also be associated with not matching the user's interests in the user's profile.

If, at block 510, the display duration meets the threshold, that is indicative of the user likely having an interest in, or likely watching, the digital content item associated with the display. As such, the process moves to block 515 to determine if a user behavior pattern is recognized.

At block 515, a determination is made if a pattern is recognized. A pattern relates to user behavior over a period of time and previous occurrences of the user watching or liking the same or similar content. As described further in FIG. 8, the user behavior pattern, as it relates to prior consumption of digital content items, can be determined based on several criteria. In one embodiment, the system uses a machine learning algorithm, and the system trains the algorithm to continuously update its pattern recognition ability with each occurrence of the user watching or liking the same or similar digital content items or with each reaction to a displayed content (e.g., does the user react by continuing to watch a displayed content or quickly skip to another content?). As such, the algorithm becomes smarter as more occurrences of user watching and selection are fed into it and becomes able to recognize whether a digital content fits a user behavior pattern with a higher probability.

If a pattern is recognized at block 515, i.e., the digital content item fits a user behavior pattern, then, at block 520, the system 100 automatically maps a key of the remote control device to the digital content item displayed. The mapping includes storing the source address of the digital content item as well at the metadata associated with the digital content item, which may also include a time stamp that correlates with a runtime within the digital content item when the user exited the digital content item, also referred to herein as an exit time stamp.

For example, if the digital content item being displayed on the display screen of a media device is an application, such as Netflix, then the source of the application and the metadata are stored, and the application is mapped to a specific key. When the specific key in inputted by the user, the source allows the application to be launched and the metadata allows the specific screen of the application where the user had existed previously to be displayed.

In another example, if the digital content item being displayed is "Moana", an animation movie on a Disney+ application (Disney+ is a trademark owned by Disney Enterprises, Inc.), where the movie "Moana" is currently in its runtime of $33^{rd}$ minute and $23^{rd}$ second, then the source of the application and the metadata (along with the exit time stamp of the $33^{rd}$ minute and $23^{rd}$ second) are stored, and the application is mapped to a specific key. When the mapped key in inputted by the user, the source allows the Disney+ application and the movie to be launched and the metadata allows the display to resume the movie "Moana" from the $33^{rd}$ minute and $23^{rd}$ second, thereby allowing the user with one click of the mapped remote key to quickly launch the specific movie from the specific time when it was previously exited.

In yet another example, the digital content item being displayed is a website, such as NBC.com (a website for the National Broadcasting Company). Let's further assume that the user had navigated to a particular page of the web site, such as "Shows," and navigated within shows to a specific show, such as "New Amsterdam," and then navigated to a sub-page for "Cast," then the source of the website and the metadata are stored and mapped to a specific key. When the specific key in inputted by the user, the source allows the website to open, and the metadata allows the page "Cast" to be displayed. As such, with the selection of the mapped key, the user can launch the website and go directly to the specific page where they had previously exited the website.

Although a few examples have been provided on the type of source and metadata captured to map a key, the embodiments are not so limited, and other applications are also contemplated. For example, television shows, digital media service provider applications, social media sites, webpages, study course videos, and personal cloud data can also be mapped to launch a specific page or point in the timeline where the user exited with one input of the mapped key.

The key to which the digital content item is mapped can be selected automatically or suggested to the user. For example, the system may determine that a specific key has been mapped before to a similar genre of content or that a specific key is empty and has not been mapped; as such the system may automatically select a key to map and map the digital content item to the selected key. Processes involved in mapping a digital content item to a key are further described in the discussion of FIG. 7 below.

In another embodiment, the system may decide to automatically map the digital content item to a specific key and provide a notification to the user informing them of the specific key and its associated digital content item that is mapped. The system may allow the user to modify the mapped key to a different key location as desired.

At block 530, when a remote control key is automatically mapped, or if the key is modified by the user, the key and its mapping are stored in a mapping table in the database of the system 100. This includes storing the source of the digital content item as well as the metadata associated with the specific point in the timeline of the digital content item being displayed or a specific page of a website such that, upon the selection of the mapped key, the application associated with the digital content item can be launched and the digital content item can be resumed from where it was previously exited, e.g., the specific page on the website or the specific point in the timeline of the digital content.

The mapping table continuously, or at periodic intervals, updates, such that the latest and most current mapping can be stored and displayed. Mappings that are no longer valid are deleted, and the mapping table is refreshed to show the latest status of the mappings. Additional detail relating to mapping tables and update of mapping tables can be found in the discussion of FIGS. 9-14.

If a pattern is not recognized at block 515, then, at block 535, the system 100 may notify the user so that the user may decide whether or not to map the digital content item displayed to a key on the remote control device.

At block 540, upon the system providing a notification to the user of a suggested mapping, the user may decide not to approve the suggested mapping. As such, as block 540, the remote control key is not mapped to the digital content item displayed. Among many reasons, the user may not approve the mapping if they are not interested in the digital content item being displayed. The data related to the user's decision not to map can also be fed into the algorithm to train it on the user's likes and dislikes such that the algorithm may enhance its ability to predict a pattern based on the user's likes and dislikes.

At block 545, upon the system providing a notification to the user of a suggested mapping, the user may decide to approve the suggested mapping, thereby indicating the user's interest in the digital content item displayed. As such, as block 545, the remote control key is mapped to the digital content item displayed. Once the user approves the decision to map, the system may either automatically select which key to map, provide the user the option of selecting a key, or automatically map and allow the user to modify the key location as desired. The data related to the user's decision to map can also be fed into the algorithm to train it further on the user's likes and dislikes such that the algorithm may enhance its ability to predict a pattern based on the user's likes and dislikes.

If, at block 545, the user decides to approve the suggested mapping and a specific key on the remote control device is mapped to the digital content item, then, at block 530, the key and its mapping are stored in a mapping table in the database of the system 100. The mapping table continuously, or at periodic intervals, updates, such that the latest and most current mapping can be stored and displayed. Mappings that are no longer valid are deleted and the mapping table is refreshed to show the latest status of the mappings.

Figure 6:
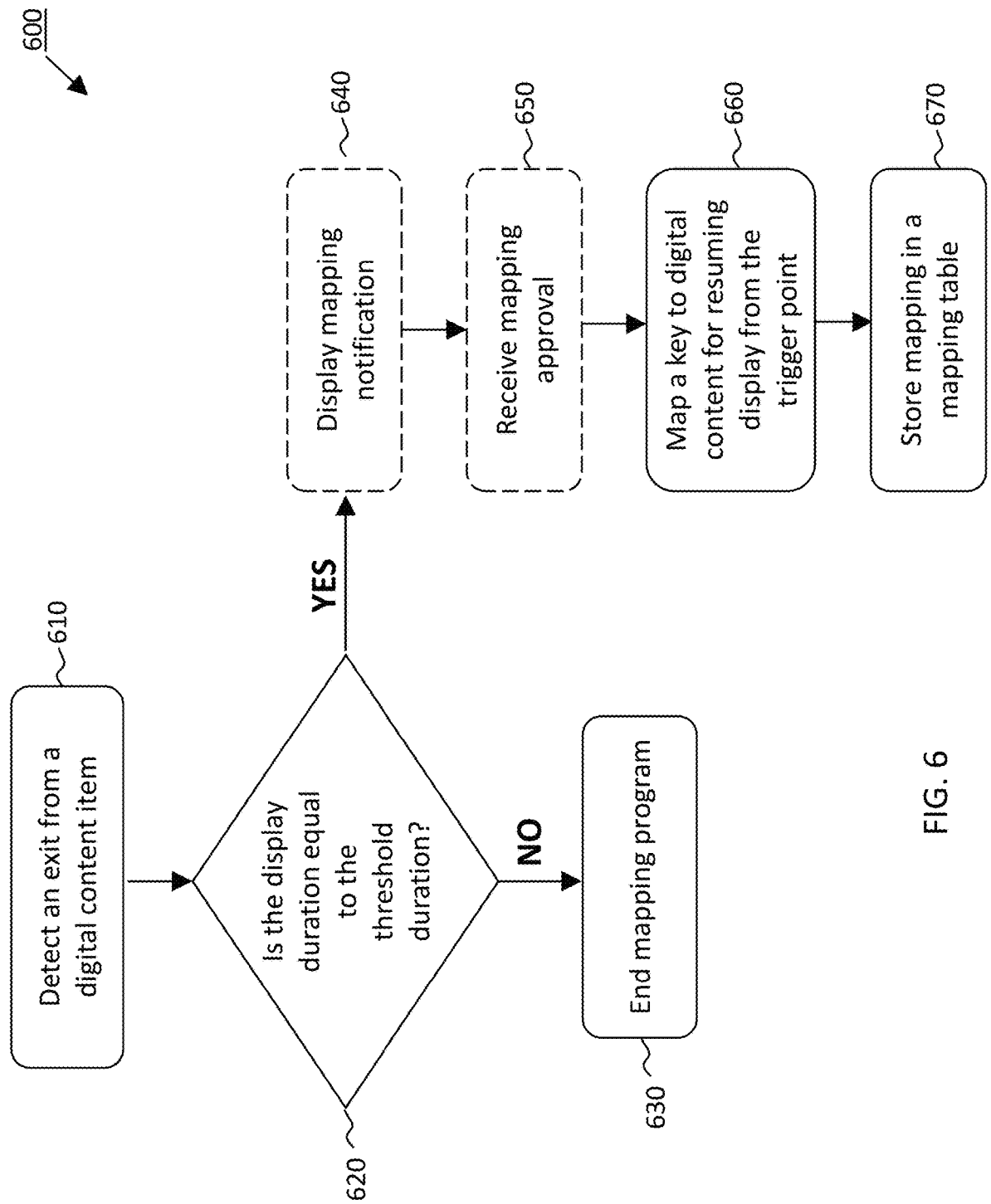
FIG. 6 is a flowchart of a process for mapping a key of a remote control device to a digital content item that has been exited midway (at a trigger point) during its display, in accordance with some embodiments of the disclosure.

FIG. 6 is a flowchart of a process 600 for mapping a key of a remote control device to a digital content item when the digital content item has been exited midway (at an exit or trigger point) during its display, in accordance with some embodiments of the disclosure.

At block 610, an exit from digital content item, midway while it is being displayed, is detected. In response to the exit, an exit time stamp at the exit/trigger point is captured and stored. The exit time stamp corresponds to the time at which the digital content item is exited (the trigger point), thereby indicating the amount of digital content item already played prior to the exit. An exit implies that the digital content item was outputted, started, and displayed on the media device, and, after some duration of the digital content item being played, the user or the system ended the display of the digital content item.

When the exit is by a user, the exit is detected based on a signal received by the media device. The signal may be to turn off the media device or switch from the currently displayed digital content item to another digital content item provided. The exit may also be based on a signal to pause the currently displayed digital content item. An exit may also be automatically detected when there is a loss of signal due to disconnection from a network or loss of power.

At block 620, a determination is made whether the display duration of the digital content item meets the threshold duration. The threshold duration is the minimum amount of the time the digital content item shall be displayed to determine that the digital content item is relevant, thereby serving as an indicator that the user may be interested in the digital content item being displayed. As such, if the display is exited at a trigger point, then the duration of the digital content item is calculated based on the starting time of the display up to the trigger/exit point. If the duration meets or exceeds the threshold duration, then it means the user is likely interested in the digital content item. Likewise, if the display duration of the digital content item does not meet the threshold duration, then it means the user is likely not interested in the digital content item.

For example, in one embodiment, the user may be browsing through a list of digital content offerings on their media device. As the user continues to browse, each digital content item may be displayed briefly. In some instances, the user may watch a trailer of a movie or just a first few minutes of a television serial. In other instances, as the user scrolls or hovers over each digital content item, a clip of the movie may be displayed automatically. Display for such smaller duration may be insufficient to meet the threshold duration, thus indicating the user is likely not interested in the content.

On the flip side, if the user browsing through a list of digital content offerings on their media device selects a digital content item and watches it for a few minutes or for a certain amount of time, or watches a trailer and selects "Play Movie" and watches the movie for a certain amount of time, or continues to watch the automated display for a longer duration, then the threshold duration is met, thereby indicating that the user likely is interested in the digital content item.

The threshold duration can be predetermined and changed by the system as needed. For example, the threshold duration may be 10, 20, or 30 minutes of displaying the digital content item. In other examples, if there is enough data that the user has watched other digital content items in the same genre, then the threshold duration may be a lesser amount of time to determine if the user is interested in the digital content item being displayed that is in the same genre. As such, the amount of time to reach the threshold duration may vary and can be predefined by the system and adjusted based on the user's behavior and content consumption history or pattern.

At block 620, if the exit by the user, or the system, occurs before the threshold duration is reached, then, at block 630, the mapping program is ended and the digital content item is not mapped to a key of the remote control device. As explained earlier, this is because the amount of time the digital content item is displayed before exiting is indicative of the user being likely not interested in the digital content item. As a secondary check, the system may also review the user's past watching behavior and the user's profile before concluding that the user is not interested in the digital content item and as such no mapping needs to be done.

At block 620, if the exit by the user, or the system, occurs once the threshold duration is reached, then, at block 660, the mapping program maps a key on the remote control device to the digital content item being displayed. Optionally, prior to mapping the key to the digital content item, the system, at block 640, may display a notification to the user thereby allowing the user to approve or disapprove the mapping and proceed to mapping the key on the remote control device if the user approves the mapping at block 650, or end the mapping program if the user disapproves the mapping (not shown in the figure).

Once the key is mapped, then, at block 670, the source of the digital content item and the metadata associated with the specific media asset as well as the exact location in the display timeline of the media asset are stored in a mapping table. The user may select to view a list of all the mappings by selecting a key on their remote control device and upon selection of the mapped key quickly launch the application as well as the media asset specifically from the same point in the timeline where the digital content item was exited.

Figure 7:
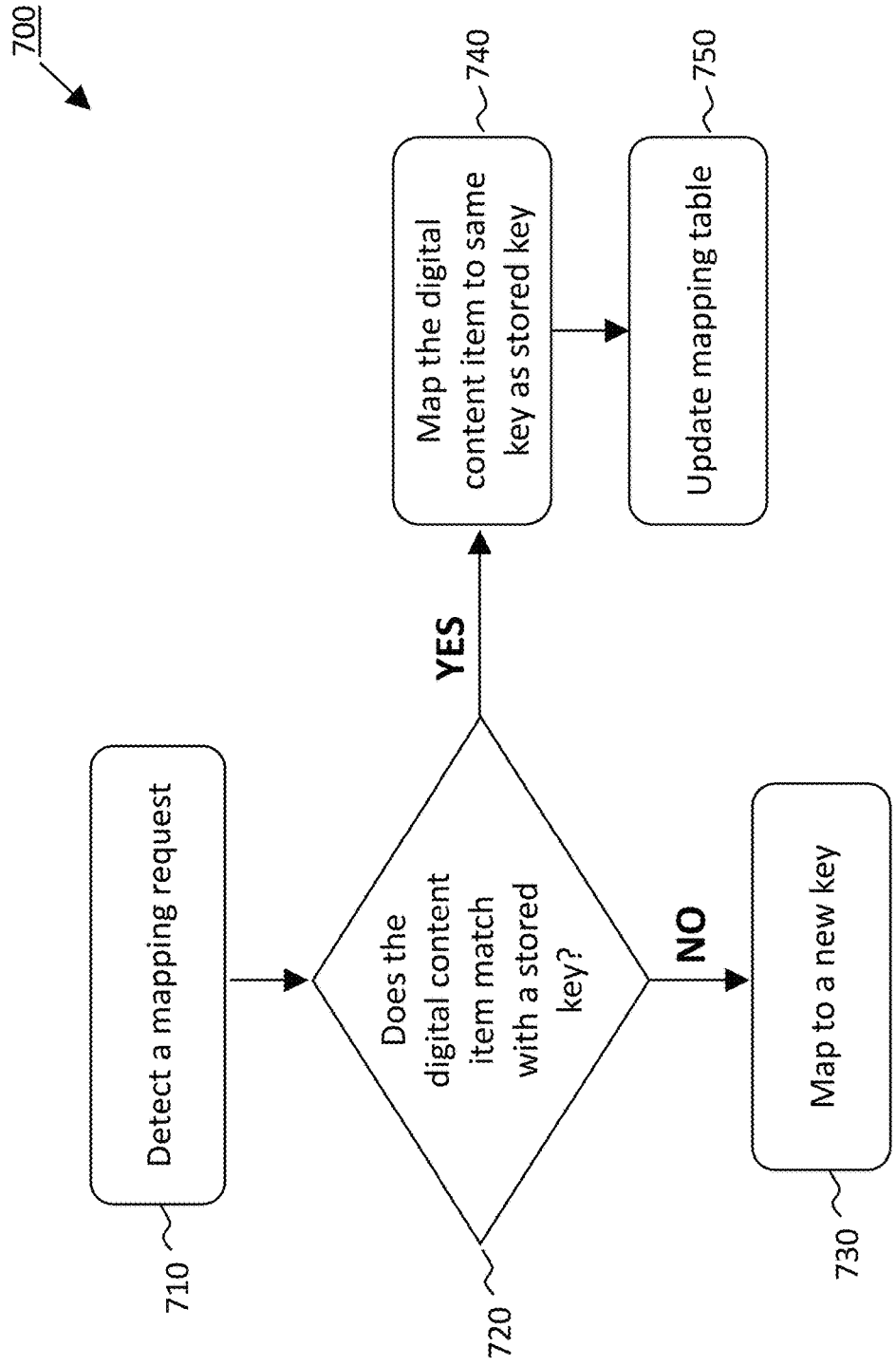
FIG. 7 is a flowchart of a process for suggesting a key location on a remote control device for mapping a digital content item, in accordance with some embodiments of the disclosure.

FIG. 7 is a flowchart of a process for suggesting a key location on a remote control device for mapping a digital content, in accordance with some embodiments of the disclosure. As mentioned previously, the decision to map a key of the remote control device to the digital content item is made either automatically by the system based on detecting a user behavior pattern in consuming content or through the user's approval when the user is notified of a mapping suggestion and the user approves the suggestion. Regardless of whether the automatic mapping or notification-based mapping method is used, once a decision to map a key is made, then, at block 710, the system receives a request to map the key of the remote control device to the digital content item displayed.

At block 720, a determination is made if the digital content item that is being mapped can be associated with an already mapped key of the remote control device. In one embodiment, the digital content item being mapped is grouped with a similar digital content item that is already mapped. For example, the grouping may be based on same genre, same actor, same member of the user's family, an episode of the same series, or some other common criterion between the digital content item being mapped and digital content item already mapped to a key of the remote control device.

The process of determining if the digital content item can be mapped to an already mapped key of the remote control device includes obtaining the metadata of the digital content item that is to be mapped. The metadata would include details of the digital content item, such as genre, cast, director, producer, production company, source, and application. The metadata of the digital content item to be mapped is then compared with metadata of digital content item already mapped to the keys of the remote control device. In some embodiments, if there is a match with any category of the metadata, such as same actor, same genre, same production company, then a match is determined. In another embodiment, more than one category may need to be matched for a match to be determined.

If a match is determined at block 720, then, at block 740, the digital content item is mapped to the same key that is already mapped to the similar digital content items. At block 750, the mapping table is updated to store the current mapping of the same key to the digital content item. The mapping table also stores the source address of the mapping and the metadata related to the mapping. Examples of mapping tables where one key is mapped to multiple digital content items are provided in FIG. 10.

Once the mapping is completed, a user may input the mapped key to display all the digital content items mapped to the key and then sub-select a digital content item from the plurality of digital content items mapped to the same key, thereby resulting in launching the application and displaying the specific digital content item from the point where the user previously exited the digital content item such that the user can seamlessly resume watching the content again.

At step 720, if a match is not determined, then, at block 730, the digital content item is mapped to new key on the remote control device. The user may be provided an option to modify the mapping to another key location on the remote control device or to move mappings around within the mapping table as they desire.

FIG. 8 is a block diagram of exemplary categories of user behavior patterns as they relate to prior consumption of content, in accordance with some embodiments of the disclosure. FIGS. 4 and 5 above describe automatic mapping performed by the mapping module 410 as one of the methods of mapping a key on the remote control device to a digital content item. The decision whether to automatically map is based on whether the digital content item, based on consumption history of the user, fits the consumption history pattern. The algorithm used for pattern recognition is trained based on the user's behavior as it relates to prior consumption of digital content items, previous occurrences of the user watching or liking the same or similar digital content, and the user's profile to predict whether a new digital content item displayed matches the pattern. A matching pattern is an indication that the user likely will find the new digital content item interesting and no matching pattern is an indication that the user likely will not find the new digital content item interesting.

FIG. 8 provides a few exemplary categories 800 used in training the algorithm to perform pattern recognition. In block 810, pattern recognition analysis is performed by the system based on a "Previously watched" category. This category relates to the user having previously watched the same digital content item, albeit only partially, not in full. A determination whether the user previously watched the same digital content item is made by accessing the user's viewing history or the tuner's output history.

If the user has watched the content previously, and if the media device is currently displaying the same content as previously watched, then the system recognizes it as such and determines a pattern match. As described earlier, a pattern match is found by comparing the metadata of the displayed digital content item with metadata of previously watched digital assets to determine if at least one metadata category (e.g., previously watched category in block 810) from the displayed digital content item matches the same metadata category from the previously watched digital content items.

However, if the system recognizes that the digital content item displayed has not been previously watched, based on the metadata comparison with previously watched digital content items, then the system recognizes that the digital content item's relevancy to the user and pattern matching cannot be established based on the previously watched category, and it continues its pattern matching analysis based on other categories.

In block 820, pattern recognition analysis is performed by the system based on the "Purchased within the threshold time" category. This category includes the digital content item being purchased by the user within a threshold period of time. For example, the user may have purchased a movie as a rental a few minutes, or a day, before the content is displayed on the media device. It may also be the case that the user purchased the digital content item during a weekday and the digital content item is being displayed on a weekend. In such scenarios, the system recognizes that the user is interested in the content as it was recently purchased, and the digital content item is being displayed within a threshold time of the purchase. The threshold time is a time period that is indicative of the user's interest in watching the purchased digital content item. For example, if the digital content item was purchased two months prior to it being displayed, then there is a lesser likelihood of the user's continued interest. Perhaps the user has already watched the purchased content or lost interest.

If a determination is made that the user has purchased the digital content item and the display of it is within a threshold time of the purchase, then the system recognizes it as such and determines a pattern match.

In block 830, pattern recognition analysis is performed by the system based on a "New digital content item released" category. This category includes release of a new movie, a new television sitcom, a new series, a special presentation, and other new releases of digital content items. If the media device is currently displaying a new release, which is indicative of the user's interest to watch a new release soon after it comes out, then the system recognizes it as such and determines a pattern match. However, if the system recognizes that the digital content item displayed is not a new release, then the system recognizes that the digital content item's relevancy to the user and pattern matching cannot be established based on the new release category, and it continues its pattern matching analysis based on other categories.

In block 840, pattern recognition analysis is performed by the system based on a "Same genre" category. This genre category includes genres such as such as comedy, horror, science fiction, action, suspense, family movie, animation, drama, romance, mystery, thriller, musical, same actor, same producer, and same motion picture company. The system matches the metadata of the digital content item displayed to determine a match with one or more genre categories.

If the media device is currently displaying a digital content item that is in the same genre as previously watched or one of the already mapped keys, then the system recognizes it as such and determines a pattern match. However, if the system recognizes that the digital content item displayed is not in the same genre as previously watched digital content items, then the system recognizes that the digital content item's relevancy to the user and pattern matching cannot be established based on the same genre category and it continues its pattern matching analysis based on other categories.

In block 850, pattern recognition analysis is performed by the system based on a "Calendared or scheduled" category. This category includes the user calendaring or scheduling the digital content item before the programming has been released. The process involves the system accessing the user's calendar, notifications, and alarms set on either the media device or on a smart device connected to the media device. The system analyzes whether the calendared or scheduled content matches the digital content that is currently displayed on the media device. If it is the same content, which is indicative of the user's interest in watching the content when it is ready to be released, then the system recognizes it as such and determines the digital content item as relevant to the user. However, if the system recognizes that the digital content item displayed has not been scheduled or calendared, then the system recognizes that the digital content item's relevancy to the user and pattern matching cannot be established based on this category, and it continues its pattern matching analysis based on other categories.

In block 860, pattern recognition analysis is performed by the system based on a "Part of a series" category. This category analyzes if the digital content item displayed is an episode from a plurality of episodes of a series. If the digital content item displayed is part of a series and the user has watched another episode of the same series, then the system recognizes it as such and determines a pattern match. However, if the system recognizes that the digital content item displayed is not part of a series, then the system recognizes that the digital content item's relevancy to the user and pattern matching cannot be established based on the part of a series category and it continues its pattern matching analysis based on other categories.

In block 870, pattern recognition analysis is performed by the system based on a "User liked similar content" category. This category determines if the user has liked other digital content items that are similar to the digital content item being displayed. This analysis can be performed by matching metadata fields of the displayed media asset with metadata fields of previously liked digital content items. The system may retrieve the user's liked history to perform this analysis.

If a determination is made that the user has liked other digital content items that are similar to the currently displayed digital content item, then the system recognizes it as such and determines a pattern match. However, if the system recognizes that the digital content item displayed is not the same as other digital content items previously liked by the user, then the system recognizes that the digital content item's relevancy to the user and pattern matching cannot be established based on the liked category, and it continues its pattern matching analysis based on other categories.

In block 880, pattern recognition analysis is performed by the system based on a "Recommended by a contact" category. Pattern recognition under this category may be performed by the system based on access to the user's social media circles, such as the user's Facebook, Instagram, Twitter, SnapChat, WhatsApp Groups and SMS text messages. Facebook is a trademark owned by Facebook, Inc., Netflix is a trademark owned by Netflix Inc., SnapChat is a trademark owned by Snap, Inc., WhatsApp is a trademark owned by WhatsApp LLC, Instagram is a trademark owned by Instagram, LLC., and Twitter is a trademark owned by Twitter, Inc.

If a recommendation for the displayed digital content item has been provided by a contact of the user that is directed specifically to the user, that increases the probability that the user is likely interested in watching the digital content item and the system recognizes it as such and determines a pattern match. However, if the system recognizes that the digital content item displayed has not been recommended directly to the user, then the system recognizes that the digital content item's relevancy to the user and pattern matching cannot be established based on the recommended by a contact category and it continues its pattern matching analysis based on other categories.

In block 890, pattern recognition analysis is performed by the system based on a "Visited multiple times" category. This category includes the user having visited the same webpage or digital content item multiple times. Even if the user has not watched the digital content item, having visited it multiple times is indicative of the user's likely interest in the digital content item and as such a pattern match is determined. However, if the system recognizes that the digital content item displayed has not been visited multiple times, then the system recognizes that the digital content item's relevancy to the user and pattern matching cannot be established based on the visited multiple times category, and it continues its pattern matching analysis based on other categories.

Although a few examples of categories used in determining a pattern have been provided above, the embodiments are not so limiting, and other pattern recognition categories and other user behavioral analysis techniques are also contemplated. For example, a user's profile may specifically indicate the user's interests in genres, actors, and types of digital content items and, as such, the user profile data may be used by the system in determining a pattern match when a digital content item is being displayed.

Each pattern match or no match/mismatch is used as a data point that is fed back into the algorithm to further train and enhance its predictability function such that the algorithm can predict with a higher probability, when reviewing the next digital content item, whether the digital content item matches a pattern. If a pattern is detected, a key from the remote control is mapped to a specific digital content item and the mapping is stored in a mapping table.

FIGS. 9-11 are a few examples of mapping tables used in accordance with some embodiments of the disclosure. FIG. 9 is one exemplary mapping table 900, in accordance with some embodiments of the disclosure. As depicted, Keys 1-n are on the remote control are mapped to different digital content items. Key 1 is mapped to a television channel, Food52, that has cooking shows and other food and nutrition related programming. The system receiving an input of Key 1 will automatically launch the Food 52 channel on the media device.

Key 2 is mapped to an application: Amazon Prime. The system receiving an input of Key 2 will automatically launch Amazon Prime on the media device. Key 3 is mapped to two specific media assets, the movie "Transformers," and the sitcom "Friends." Since both are offered through the same digital service provider, HBO Go, they are mapped to the same key such that the user can associate Key 3 with all HBO Go programming.

Key 4 is mapped to a Web URL, and so on. In addition to numbered keys, a check mark (√) symbol is depicted as key that is used for mapping a specific music video channel on YouTube for a band known as "Maroon 5". The system receiving an input of Key "√", which is a check mark (√) symbol, will automatically launch the application for You- Tube and display the specific channel within YouTube for Maroon 5 music videos. Maroon 5 is a trademark owned by James Valentine, Mickey Madden, Adam Levine, Ryan Dusick, and Jessie Carmichael.

Although certain numbers and symbols are depicted in FIG. 9, the number of keys and the type of keys are not so limited. Additionally, the limitation of the remote control device, such as the physical number of key options on a physical remote control are also not a limiting factor in mapping keys. As described earlier, a variety of remote control devices can be used in accordance with some embodiments of the disclosure. Some examples of remote control devices are depicted in FIGS. 2A-2C, however, other electronic devices, such as pointers, smart watches, and tablets, can also be used as a remote control device. Although the number of physical keys on the physical remote control devices are limited, the number of keys that can be mapped are not so limited.

For example, the media device is capable of displaying a QWERTY keyboard (or other types of digital keyboards) that can be used for generating a wide variety of keys that include numbers, combination of numbers, alphabets, combinations of alphabets, symbols, combinations of symbols, and various forms of unique characters that can be generated through touch-screen interfaces of electronic devices, and other gesturing motions that can be inputted through gaming devices.

Additionally, numbers, alphabets, and words from different languages; symbols and icons from various libraries; or user-created or imported unique symbols and words can also be used as keys for mapping digital content item.

FIG. 10 is another exemplary mapping table where a single key is mapped to multiple digital content items, in accordance with some embodiments of the disclosure. A single key can either be mapped to a single digital content item or multiple digital content items. As depicted, Key 1 is mapped to the same application, Disney+. The sub-mappings are to different media assets, "Frozen 1" Movie and "Avengers 2" Movie (Frozen is a trademark owned by Disney Enterprises, Inc., and Avengers is a trademark owned by Marvel Characters, Inc.). The mapping and sub-mappings are stored in the mapping table 1000 along with their source and related metadata. The source is used in launching the application and the media asset, and the metadata is used for starting the media asset from a specific location in the media asset's timeline, such as 14 minutes and 3 seconds into the movie "Frozen 1", and 58 minutes and 11 seconds into the movie "Avengers 2".

Key 2 is mapped to different applications and different media assets. As depicted, Key 2 is mapped to the Netflix, Public Broadcasting System (PBS) and HBO Go applications. The key is further sub-mapped within each application to specific media assets, such as the movie "Mission Control", a documentary on "NASA flight", and the movie "The Astronaut Farmer". In one embodiment, the media assets mapped are about space and space exploration and share the space genre. As such, as described in process 700 of FIG. 7, a common key, Key 2, may have been assigned to group all space-related mappings to a single key such that the user can easily associate Key 2 with all space-related mappings.

FIG. 11 is a mapping table with personalized key names, in accordance with some embodiments of the disclosure. A user may choose to name the keys after members of their household such that each person can input their named key to view all their mapped programming. For example, Jack can input his name, and the system will display the mapping table that shows all the digital content items mapped and associated with the key named "Jack". An acronyms of suggestive letters, such as BB for "The Big Bang Theory," can also be used as a key.

FIG. 12 is a mapping table 1200 depicting mapping of a Website URL, in accordance with some embodiments of the disclosure. As depicted, a key named SCI is used to map to a website for NASA and specifically to Page 7 of the website (NASA is a trademark owned by THE U.S. GOVERNMENT AND ITS GOVERNMENT FEDERAL AGENCY NATIONAL AERONAUTICS & SPACE ADMINISTRATION FEDERAL AGENCY UNITED STATES). In this embodiment, the user is using an internet browser, the application Google Chrome, to browse NASA's website. In this embodiment, the user has navigated thorough the NASA website and landed on Page 7 before exiting the website or the application. Since the amount of time spent on browsing the website (which can be measured by the display time on the media device) met or exceeded the threshold duration, Page 7 of the NASA website was either automatically mapped or mapped based on a notification approval to the key named SCI. As such, when an input of a Key SCI is received by the media device, the application Google Chrome is launched, and the display is taken directly to Page 7 of the NASA website.

FIG. 13 is a mapping table depicting mapping to a paid course, in accordance with some embodiments of the disclosure. A user taking a course, especially a long course with several videos and chapters, may start and stop the course several times in their effort to complete the course. In some instances, the course provider may require the user to log in each time the course is resumed, making it cumbersome for the user to launch the application, log in, and then navigate to the same point, page, or chapter in the course materials or the course video where they exited last.

As depicted, to make it convenient for the user such that they can skip through all the launching and logging-in procedures and directly resume at the same point at which they previously exited in the course, the embodiments of the disclosure automatically (or through notification-based approval process) map the UD key to the course on Udemy relating to Streaming Video (Udemy is a trademark owned by Udemy, Inc.). The mapping is saved in the mapping table 1300 along with its source. Metadata related to the course that includes the specific point in the course where the course was exited is also saved, e.g., Chapter 4, 7 minutes and 18 seconds. In another embodiment, an exit time stamp that corresponds to the time of exit may also be captured and saved. The login details may also be saved.

When an input of a Key UD is received by the media device, the Udemy application is launched, the login is automatically entered to access the media assets within the Udemy application, and the display of Chapter 4, that is 7 minutes and 18 seconds into the Chapter is displayed, for example by using the exit time stamp as a resume position, thereby allowing the user to seamlessly pick up exactly where they exited previously such that no content is missed.

As discussed above, in most embodiments, when the input of a mapped key is entered, the display resumes from the same point in time where the user previously exited the content. In some embodiments, the resume position in the timeline can be modified such that when the display is resumed based on the input of a key, the point in the timeline where it resumes is a few minutes prior to the where the user previously exited the content. Having the resume position a few minutes prior to where the user previously exited the content may allow the user to watch a few minutes of the previously watched portion of the digital content item, which would serve as a reminder to the user of the last segment watched before they continue to the unwatched content. For example, if the user exited a movie at a point that is 50 minutes and 15 seconds into the movie, the system may allow the resume position to be preset 5 minutes before when the user exited a movie, e.g., at 45 minutes and 15 seconds, such that the user may refamiliarize themselves with the story based on the few minutes of the previously watched content and then continue to display the movie from that point forward.

Figure 14:
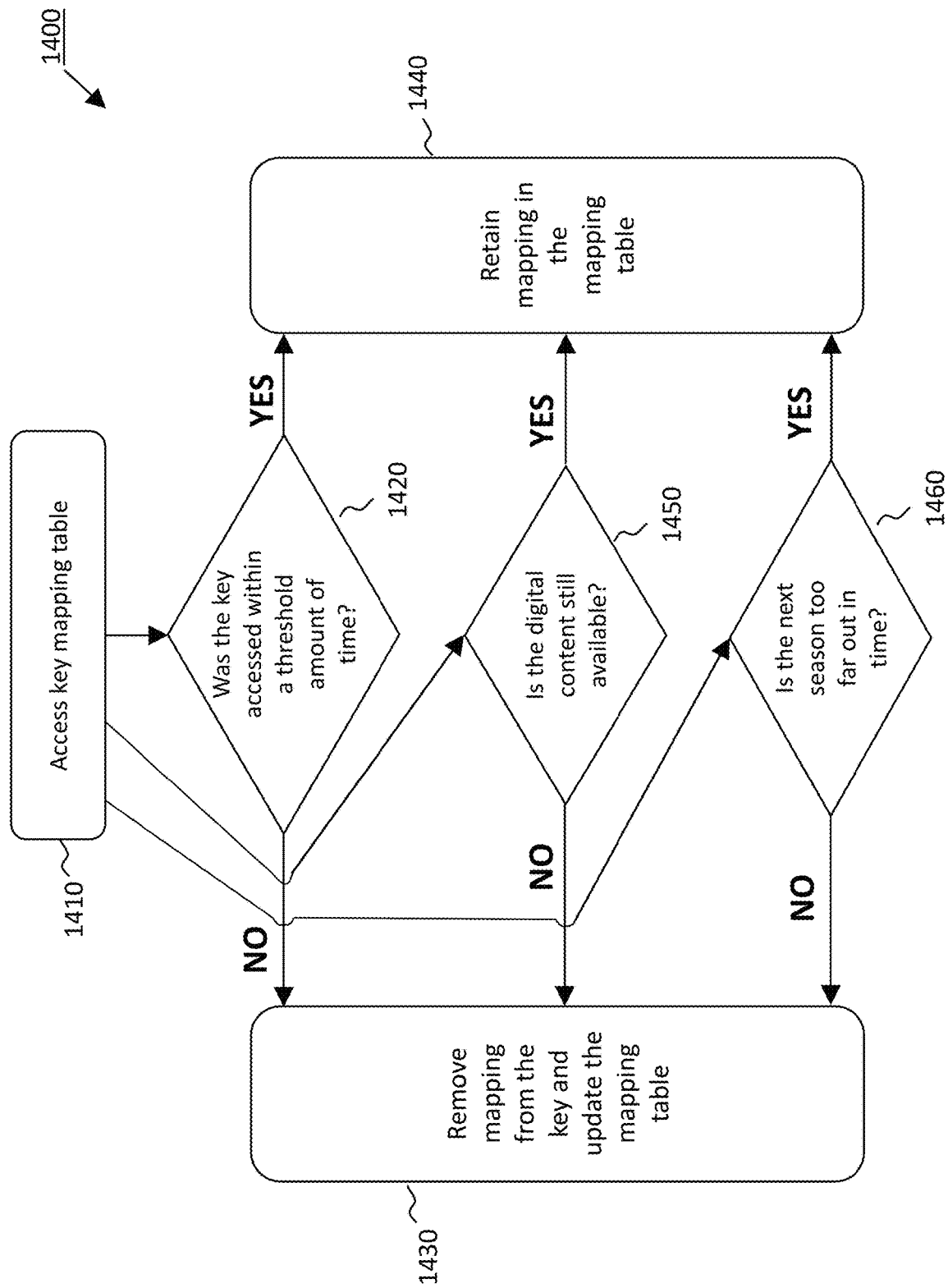
FIG. 14 is a flowchart of a process for updating entries in a mapping table, in accordance with some embodiments of the disclosure.

FIG. 14 is a flowchart of a process 1400 for updating entries in a mapping table, in accordance with some embodiments of the disclosure. Since the digital content items that are mapped to the keys may change over time, such as due to expiration of the content, content deletion, or the content having moved to another source, the system updates the key mapping table to ensure that the mapping to the digital content item is current, and if the old mapping is no longer valid, it then deletes its associated mapped key from the mapping table.

The process at block 1410 accesses a key mapping table. Some exemplary key mapping tables were depicted in FIGS. 9-13. At block 1420, the system makes a determination whether the mapped key was accessed within a threshold amount of time by the user. Having accessed the key within a threshold amount of time is indicative of the user's continued interest in the content. For example, a key not accessed by the user for several weeks or months is likely not relevant and not of interest to the user anymore or may be less relevant than other digital content item that is accessed more recently.

The threshold amount of time is predefined and may vary based on the type of digital content item. For example, a key associated with a school course not accessed for a month may still be relevant to the user if the user is scheduled to complete the course for a certification in the next three months, while a website not accessed for a month may not be as relevant if there is no completion, deadline, or some other task associated with it. A movie rented for seven days may still be relevant if the key associated with the movie has not been accessed for four weekdays, as the user may have preferred to watch the movie over the weekend. The threshold of time may be preset by the system and modified by the user as needed.

If a determination is made at block 1420 that the key has not been accessed within the threshold amount of time, then, at block 1430, the mapping is removed from the previously mapped key and the mapping table is updated to remove the entry associated with the previously mapped key. However, if a determination is made at block 1420 that the key has been accessed within the threshold amount of time, then, at block 1440, the mapping is retained in the mapping table.

At block 1450, the system makes a determination whether the digital content item associated with the mapped key is still available. In some embodiments, the digital content item may have been removed from the source, it may have been moved to another source, or, if it is a limited time rental, the rental period may have expired. There may be other reasons that the digital content item is not available, including the digital content item getting corrupted.

Regardless of the reason why the digital content item is not available, if determination is made at block 1450 that the digital content item associated with the mapped key is no longer available, since the mapped key can no longer access the digital content item, it makes sense at block 1430 to remove the mapping from the previously mapped key and update the mapping table to remove the entry associated with the previously mapped key. However, if a determination is made at block 1450 that the digital content item is still available, then, at block 1440, the mapping is retained in the mapping table.

At block 1460, the system makes a determination whether the digital content item associated with the mapped key will not be available for a long period of time. The system may determine what is considered a long period of time or may specifically define what is considered a long period of time based on the type of digital content item and the user's behavior history.

In one example, if a series having a plurality of episodes has ended its season, and the user has watched all the available episodes, and the next season is not scheduled to release for another two years, then in such a situation, the system may determine that the next season release is too far out in time for the mapping to stay relevant.

As such, if a determination is made at block 1460 that the digital content item associated with the mapped key is no longer available, since the mapped key can no longer access the digital content item, it makes sense at block 1430 to remove the mapping from the previously mapped key and update the mapping table to remove the entry associated with the previously mapped key. However, if a determination is made at block 1460 that the next season of the digital content item is available within a predefined timeframe, then, at block 1440, the mapping is retained in the mapping table.

Although blocks 1420, 1450, and 1460 provide examples of determinations made to update the mapping table by either retaining or removing the mapping, other examples and determinations are also contemplated. For example, a determination may be made whether the user has updated their profile to change their interests and as such certain keys mapped to their older interests may no longer be relevant based on the user profile interest update.

In some embodiments, the determinations made in exemplary blocks 1420, 1450, 1460 and other determinations made to update the mapping table can be performed at a predefined interval or on a continuous basis. The system may set guidelines on how often and when the mapping table updates are to be performed, which can be modified by the user as desired.

Figure 15:
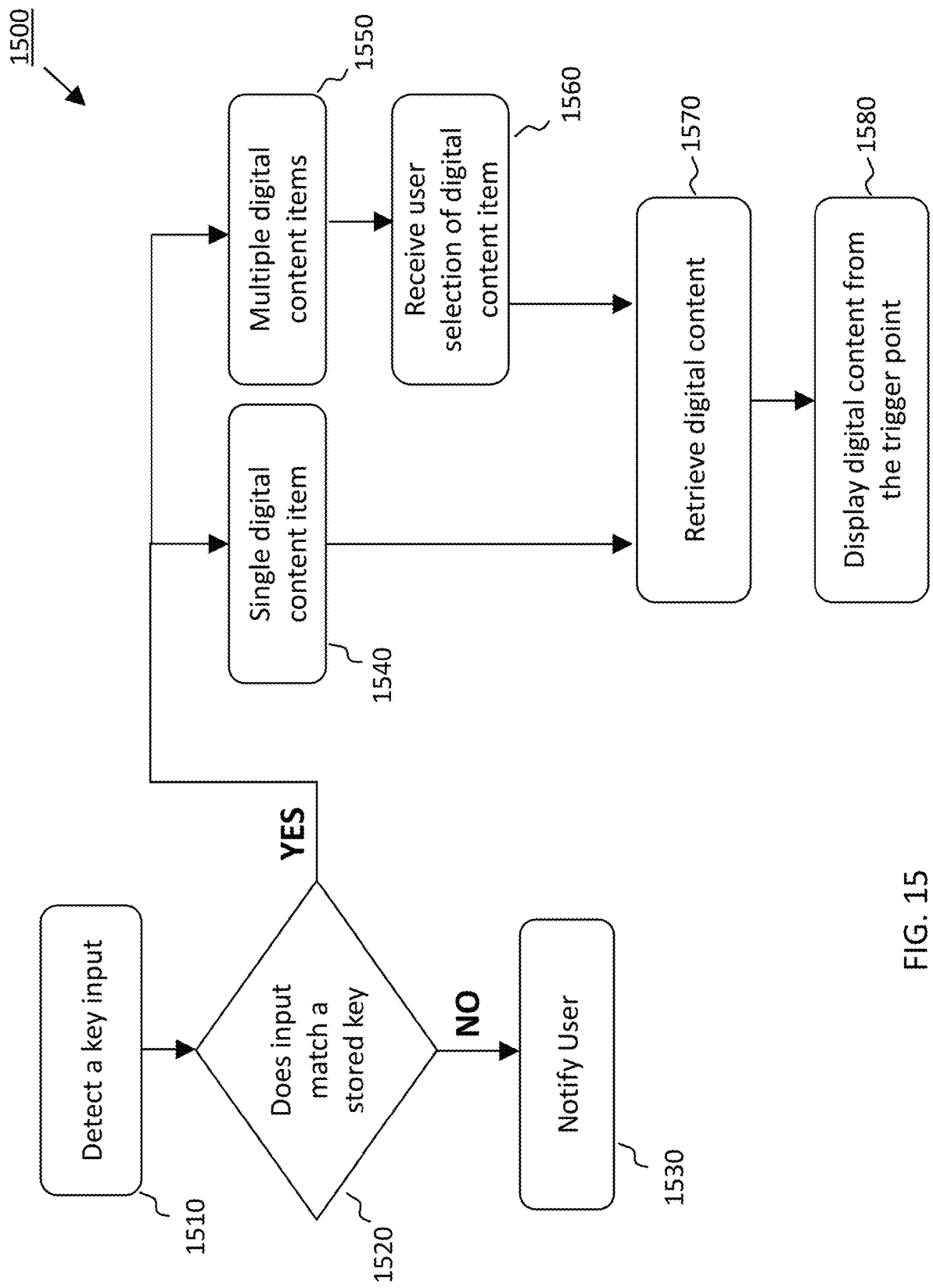
FIG. 15 is a flowchart of a process for retrieving a digital content item and displaying it in response to a key input, in accordance with some embodiments of the disclosure.

FIG. 15 is a flowchart of a process for retrieving a digital content item and displaying it in response to a key input, in accordance with some embodiments of the disclosure. The process includes detecting a key input at block 1510. The input may be a signal received by the media device from a remote control device, such as the exemplary remote control devices of FIGS. 2A-C, that includes a specific key.

At block 1520, the system evaluates the key input and compares it with a list of mapped keys that are stored in the mapping table to determine a match. If the key input does not match a key stored in the mapping table, then, at block 1530, the system either does nothing (not shown in figure) or notifies the user that the key is not mapped to a digital content item.

If, at block 1520, the key input matches a key stored in the mapping table, then the system determines if the key is mapped to a single digital content item or multiple digital content items. If the key is mapped to multiple digital content items, as depicted in block 1550, then the system displays all the mappings related to the input key. For example, as shown in FIG. 10, if the input is for Key 2, and Key 2 is mapped to multiple digital content items, then the system may show that Key 2 is mapped to three digital content items, namely, the movie "Mission Control", a documentary on NASA flight, and the movie "The Astronaut Farmer".

The system may provide an option to the user to select from one of the three digital content items displayed. At block 1560, the system receiving one selection from the options displayed may proceed to block 1570 to retrieve the source and metadata associated with a digital content item selected.

If, at block 1520, the key input matches a key stored in the mapping table, and the key is associated with a single digital content item, as depicted in block 1540, then the system receives the source and metadata associated with the single digital content item.

At block 1580, the application relating to the digital content item associated with the mapped key is launched and the metadata is used to display the digital content item from the position in time where the user previously exited from the digital content item.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The invention claimed is:

1. A method of mapping a key of an input device to enable direct fast access to a digital content item, the method comprising:
   determining that an output of the digital content item on a display screen of a media device meets a threshold duration;
   determining, based on content consumption pattern of a user, whether the digital content item is relevant to the user; and
   in response to determining that the digital content item is relevant to the user:
      automatically configuring a mapping table of the media device to map the key of the input device to a direct fast access of the digital content item; and
      storing the mapping of the mapped key of the input device in the mapping table, wherein the stored mapping includes an identification of the digital content item that is mapped to the key, and the source and metadata associated with the digital content item.

2. The method of claim 1, wherein in response to not being able to determine if the digital content item is relevant to the user based on the content consumption pattern of the user:
   enabling an option to approve or deny a suggested mapping;
   receiving an approval of the suggested mapping; and
   storing the suggested mapping in the mapping table.

3. The method of claim 1, further comprising, determining whether the digital content item is relevant to the user after receiving an acknowledgement that the digital content item was outputted for a period of time that meets the threshold duration.

4. The method of claim 1, wherein, determining whether the digital content item is relevant to the user further comprising:
   comparing the metadata associated with the digital content item with a plurality of user behavior categories; and
   determining that the digital content item is relevant to the user if the metadata of the digital content item matches a category from the plurality of user behavior categories.

5. The method of claim 4, wherein the plurality of user behavior categories are selected from a group consisting of: previously watched digital content items, purchased within a threshold amount of time, new release, same genre, calendared of scheduled content, an episode of a watched series, similar content liked by user, recommended digital content item, multiple visits to the digital content item, and user profile.

6. The method of claim 1, wherein, determining whether the digital content item is relevant to the user further comprising:
   training an algorithm based on a plurality of historical user behaviors; and
   applying the trained algorithm to predict whether the displayed digital content item matches the content consumption pattern.

7. The method of claim 1, wherein mapping the key to the digital content item includes automatically selecting a key on a remote control device and mapping the digital content item to the selected key.

8. The method of claim 1, wherein mapping the key to the digital content item further comprising:
   detecting a mapping request for the digital content item;
   determining if the digital content item matches a second digital content item that is already mapped to a key of a remote control device; and
   in response to determining that the digital content item matches the second digital content item that is already mapped to the key of the remote control device:
   mapping the digital content item to the same key as the key used for mapping the second digital content item.

9. The method of claim 1, further comprising:
   accessing the mapping table, wherein the mapping table stores a list of all mapped keys and the digital content items to which the keys are mapped;
   determining an active/inactive status of each mapping in the mapping table; and
   in response to determining an inactive status of the mapping, removing the mapping from the mapped key.

10. The method of claim 9, wherein the status is determined based on a group consisting of: key not accessed within a threshold amount of time, digital content item not accessible, and digital content item not released for a threshold amount of time.

11. The method of claim 1, wherein the key mapped is associated with a remote control device, wherein the remote control device is selected group consisting of: a television remote control, a smart mobile phone, a tablet, an electronic device capable of communicating with a media device, and a gaming device.

12. The method of claim 1, further comprising:
receiving an input of the mapped key; and
in response to receiving the input for the key:
    accessing the mapping table to retrieve the source and metadata associated with the digital content item mapped to the mapped key;
    using the source, launching an application associated with the digital content item; and
    using the metadata, resuming the output of the digital content item on the media device from a point in time where the digital content item was exited previously.

13. A method of suggesting a mapping for directly enabling quick access to a media asset comprising:
detecting an exit from a media asset displayed on a media device;
determining whether the exit occurred after a threshold amount of time; and
in response to determining that the exit occurred after a threshold amount of time:
    obtaining the source address, metadata, and exit time stamp associated with the media asset;
    mapping the media asset to a designated key on a remote control device for direct quick access to the media asset; and
    in response to receiving an input of the mapped key, resuming the display of the media asset from the exit time stamp.

14. The method of claim 13, wherein mapping the media asset to a designated key on a remote control device is performed automatically in response to determining, based on a user's content consumption pattern, that the digital content item is relevant to the user.

15. The method of claim 13, wherein mapping the media asset to a designated key on a remote control device further comprises:
enabling an option to approve or deny a suggested mapping; and
receiving an approval of the suggested mapping.

16. A system for mapping a key of an input device to enable direct fast access to a digital content item, the system comprising:
communication circuitry configured to access a remote control device and a media device; and
control circuitry configured to:
    determine that an output of the digital content item on a display screen of a media device meets a threshold duration;
    determine, based on content consumption pattern of a user, whether the digital content item is relevant to the user; and
    in response to determining that the digital content item is relevant to the user:
        automatically configure a mapping table of the media device to map the key of the remote control device to a direct fast access of the digital content item; and
        store, using the communications circuitry, the mapping of the mapped key of the remote control device in the mapping table, wherein the stored mapping includes an identification of the digital content item that is mapped to the key, and the source and metadata associated with the digital content item.

17. The system of claim 16, wherein in response to the control circuitry not being able to determine if the digital content item is relevant to the user based on the content consumption pattern of the user, the control circuitry configured to:
enable an option to approve or deny a suggested mapping;
receive an approval of the suggested mapping; and
store the suggested mapping in the mapping table.

18. The system of claim 16, wherein, determining whether the digital content item is relevant to the user comprises, the control circuitry further configured to:
compare the metadata associated with the digital content item with a plurality of user behavior categories; and
determine that the digital content item is relevant to the user if the metadata of the digital content item matches a category from the plurality of user behavior categories.

19. The system of claim 16, wherein, determining whether the digital content item is relevant to the user comprises, the control circuitry further configured to:
train an algorithm based on a plurality of historical user behaviors; and
apply the trained algorithm to predict whether the displayed digital content item matches the content consumption pattern.

20. The system of claim 16, wherein mapping the key to the digital content item includes, the control circuitry configured to automatically selecting a key on a remote control device and mapping the digital content item to the selected key.

* * * * *